US007930389B2

(12) United States Patent
Jung et al.

(10) Patent No.: US 7,930,389 B2
(45) Date of Patent: Apr. 19, 2011

(54) ADAPTIVE FILTERING OF ANNOTATED MESSAGES OR THE LIKE

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
William Henry Mangione-Smith, Kirkland, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 458 days.

(21) Appl. No.: 11/986,559

(22) Filed: Nov. 20, 2007

(65) Prior Publication Data

US 2009/0132667 A1    May 21, 2009

(51) Int. Cl.
*G06F 15/16* (2006.01)
(52) U.S. Cl. ........... 709/224; 709/206; 709/203; 726/13
(58) Field of Classification Search .................. 709/224, 709/203, 206
See application file for complete search history.

(56) References Cited

U.S. PATENT DOCUMENTS

| 5,128,938 A | 7/1992 | Borras |
| 5,548,535 A | 8/1996 | Zvonar |
| 5,596,750 A | 1/1997 | Li et al. |
| 5,812,865 A | 9/1998 | Theimer et al. |
| 5,892,909 A | 4/1999 | Grasso et al. |
| 6,006,225 A | 12/1999 | Bowman et al. |
| 6,009,433 A | 12/1999 | Kurano et al. |
| 6,014,716 A | 1/2000 | Ohara |
| 6,031,453 A | 2/2000 | Brinzer |
| 6,074,787 A | 6/2000 | Takeuchi |
| 6,081,816 A | 6/2000 | Agrawal |
| 6,105,072 A | 8/2000 | Fischer |
| 6,151,311 A | 11/2000 | Wheatley, III et al. |
| 6,157,379 A | 12/2000 | Singh |
| 6,192,396 B1 | 2/2001 | Kohler |
| 6,208,965 B1 | 3/2001 | Brown et al. |
| 6,212,553 B1 | 4/2001 | Lee et al. |
| 6,219,731 B1 | 4/2001 | Gutowitz |
| 6,237,141 B1 | 5/2001 | Holzle et al. |
| 6,243,378 B1 | 6/2001 | Olnowich |
| 6,263,311 B1 | 7/2001 | Dildy |
| 6,266,675 B1 | 7/2001 | Evans et al. |
| 6,287,125 B1 | 9/2001 | Dorcely |
| 6,308,148 B1 | 10/2001 | Bruins et al. |
| 6,320,112 B1 | 11/2001 | Lotze |
| 6,341,359 B1 | 1/2002 | Aiken et al. |
| 6,349,238 B1 | 2/2002 | Gabbita et al. |
| 6,374,221 B1 | 4/2002 | Haimi-Cohen |
| 6,377,953 B1 | 4/2002 | Gawlick et al. |
| 6,378,128 B1 | 4/2002 | Edelstein et al. |

(Continued)

OTHER PUBLICATIONS

"Called-Party Camp-On"; Wikipedia, The Free Encyclopedia; bearing a date of Mar. 20, 2007; printed on Apr. 2, 2007; p. 1; located at: http://en.wikipedia.org/wiki/Called-party_camp-on.

(Continued)

*Primary Examiner* — David Lazaro

(57) ABSTRACT

A system, method, computer program product, and carrier are described for obtaining an indication of one or more message filtering rules and accepting text-containing content after obtaining the indication of the one or more message filtering rules and after a value acceptance of a delivery evaluation of the text-containing content.

38 Claims, 12 Drawing Sheets

U.S. PATENT DOCUMENTS

| | | |
|---|---|---|
| 6,389,475 B1 | 5/2002 | Speakman et al. |
| 6,401,100 B1 | 6/2002 | Gladieux |
| 6,418,136 B1 | 7/2002 | Naor et al. |
| 6,418,424 B1 | 7/2002 | Hoffberg et al. |
| 6,424,946 B1 | 7/2002 | Trischler et al. |
| 6,425,128 B1 | 7/2002 | Krapf et al. |
| 6,430,573 B1 | 8/2002 | Pachet et al. |
| 6,452,607 B1 | 9/2002 | Livingston |
| 6,480,885 B1 | 11/2002 | Olivier |
| 6,496,600 B1 | 12/2002 | Huang |
| 6,526,258 B2 | 2/2003 | Bejar et al. |
| 6,539,050 B1 | 3/2003 | Lee et al. |
| 6,539,376 B1 | 3/2003 | Sundaresan et al. |
| 6,546,005 B1 | 4/2003 | Berkley et al. |
| 6,549,950 B2 | 4/2003 | Lytle et al. |
| 6,560,576 B1 | 5/2003 | Cohen et al. |
| 6,564,321 B2 | 5/2003 | Bobo, II |
| 6,565,610 B1 | 5/2003 | Wang et al. |
| 6,570,850 B1 | 5/2003 | Gutierrez et al. |
| 6,574,744 B1 | 6/2003 | Kantz et al. |
| 6,594,630 B1 | 7/2003 | Zlokarnik et al. |
| 6,594,654 B1 | 7/2003 | Salam et al. |
| 6,594,672 B1 | 7/2003 | Lampson et al. |
| 6,614,551 B1 | 9/2003 | Peek |
| 6,621,892 B1 | 9/2003 | Banister et al. |
| 6,629,635 B1 | 10/2003 | Akamine |
| 6,633,868 B1 | 10/2003 | Min et al. |
| 6,662,223 B1 | 12/2003 | Zhang et al. |
| 6,678,360 B1 | 1/2004 | Katz |
| 6,690,390 B1 | 2/2004 | Walters et al. |
| 6,691,159 B1 | 2/2004 | Grewal et al. |
| 6,700,591 B1 | 3/2004 | Sharpe |
| 6,700,678 B1 | 3/2004 | Luman |
| 6,704,905 B2 | 3/2004 | Fukushige et al. |
| 6,711,291 B1 | 3/2004 | Stubler et al. |
| 6,724,373 B1 | 4/2004 | O'Neill, Jr. et al. |
| 6,725,229 B2 | 4/2004 | Majewski et al. |
| 6,748,320 B2 | 6/2004 | Jones |
| 6,751,593 B2 | 6/2004 | Tetsumoto |
| 6,772,396 B1 | 8/2004 | Cronin et al. |
| 6,775,358 B1 | 8/2004 | Breitenbach et al. |
| 6,785,341 B2 | 8/2004 | Walton et al. |
| 6,785,867 B2 | 8/2004 | Shaffer et al. |
| 6,788,308 B2 | 9/2004 | Reavy et al. |
| 6,804,224 B1 | 10/2004 | Schuster et al. |
| 6,810,422 B1 | 10/2004 | Cross |
| 6,813,043 B1 | 11/2004 | Mizuyama et al. |
| 6,813,507 B1 | 11/2004 | Gress et al. |
| 6,816,901 B1 | 11/2004 | Sitaraman et al. |
| 6,820,079 B1 | 11/2004 | Evans |
| 6,839,777 B1 | 1/2005 | Vrancic et al. |
| 6,842,860 B1 | 1/2005 | Branstad et al. |
| 6,850,988 B1 | 2/2005 | Reed |
| 6,851,049 B1 | 2/2005 | Price, III |
| 6,868,427 B2 | 3/2005 | Herzog et al. |
| 6,892,330 B2 | 5/2005 | Lee |
| 6,892,352 B1 | 5/2005 | Myers |
| 6,895,426 B1 | 5/2005 | Cortright et al. |
| 6,904,168 B1 | 6/2005 | Steinberg et al. |
| 6,904,183 B2 | 6/2005 | Slatter |
| 6,910,028 B2 | 6/2005 | Chan et al. |
| 6,910,033 B2 | 6/2005 | Rosenblum |
| 6,910,067 B1 | 6/2005 | Sitaraman et al. |
| 6,925,458 B2 | 8/2005 | Scaturro et al. |
| 6,934,889 B2 | 8/2005 | Owari |
| 6,934,916 B1 | 8/2005 | Webb et al. |
| 6,937,766 B1 | 8/2005 | Wilf et al. |
| 6,938,196 B2 | 8/2005 | Richardson et al. |
| 6,941,466 B2 | 9/2005 | Mastrianni |
| 6,941,513 B2 | 9/2005 | Meystel et al. |
| 6,947,068 B2 | 9/2005 | Forkner et al. |
| 6,947,948 B2 | 9/2005 | Wang et al. |
| 6,959,389 B1 | 10/2005 | Dunn et al. |
| 6,961,766 B2 | 11/2005 | Janosik, Jr. et al. |
| 6,981,023 B1 | 12/2005 | Hamilton et al. |
| 6,985,172 B1 | 1/2006 | Rigney et al. |
| 6,985,830 B2 | 1/2006 | Lee et al. |
| 6,987,840 B1 | 1/2006 | Bosik et al. |
| 6,990,525 B1 | 1/2006 | Ying et al. |
| 6,993,563 B2 | 1/2006 | Lytle et al. |
| 6,999,469 B1 | 2/2006 | Chu et al. |
| 7,006,827 B2 | 2/2006 | Masuda et al. |
| 7,010,616 B2 | 3/2006 | Carlson et al. |
| 7,020,651 B2 | 3/2006 | Ripley |
| 7,020,688 B2 | 3/2006 | Sykes, Jr. |
| 7,027,645 B2 | 4/2006 | Swift |
| 7,031,438 B1 | 4/2006 | Cheston, III et al. |
| 7,038,680 B2 | 5/2006 | Pitkow |
| 7,039,637 B2 | 5/2006 | Murray et al. |
| 7,054,421 B2 | 5/2006 | Kandlur et al. |
| 7,054,882 B2 | 5/2006 | Dockter et al. |
| 7,058,688 B2 | 6/2006 | Lin |
| 7,062,508 B2 | 6/2006 | Andreev et al. |
| 7,062,535 B1 | 6/2006 | Stark et al. |
| 7,072,901 B2 | 7/2006 | Teraguchi et al. |
| 7,072,942 B1 | 7/2006 | Maller |
| 7,076,485 B2 | 7/2006 | Bloedorn |
| 7,076,533 B1 | 7/2006 | Knox et al. |
| 7,080,384 B2 | 7/2006 | Wall et al. |
| 7,089,256 B2 | 8/2006 | Smialek |
| 7,089,497 B2 | 8/2006 | Abbott et al. |
| 7,095,855 B1 | 8/2006 | Collins |
| 7,103,154 B1 | 9/2006 | Cannon et al. |
| 7,107,291 B2 | 9/2006 | Nishikawa et al. |
| 7,110,664 B2 | 9/2006 | Yogeshwar et al. |
| 7,110,890 B2 | 9/2006 | Birkett et al. |
| 7,117,210 B2 | 10/2006 | DeSalvo |
| 7,119,923 B1 | 10/2006 | Iwaki |
| 7,120,628 B1 | 10/2006 | Conmy et al. |
| 7,124,302 B2 | 10/2006 | Ginter et al. |
| 7,130,887 B2 | 10/2006 | Goldberg |
| 7,133,880 B1 | 11/2006 | Nori et al. |
| 7,139,825 B2 | 11/2006 | Andaker et al. |
| 7,142,140 B2 | 11/2006 | Dennis |
| 7,143,083 B2 | 11/2006 | Carlbom et al. |
| 7,146,134 B2 | 12/2006 | Moon et al. |
| 7,146,234 B2 | 12/2006 | Woehler |
| 7,149,649 B2 | 12/2006 | Haft et al. |
| 7,149,780 B2 | 12/2006 | Quine et al. |
| 7,159,029 B2 | 1/2007 | Laarhuis et al. |
| 7,162,474 B1 | 1/2007 | Harker et al. |
| 7,162,515 B2 | 1/2007 | Engstrom |
| 7,164,921 B2 | 1/2007 | Owens et al. |
| 7,177,816 B2 | 2/2007 | Ehlen et al. |
| 7,181,694 B2 | 2/2007 | Reiss et al. |
| 7,191,117 B2 | 3/2007 | Kirby et al. |
| 7,191,252 B2 | 3/2007 | Redlich et al. |
| 7,194,656 B2 | 3/2007 | Hayward |
| 7,200,592 B2 | 4/2007 | Goodwin et al. |
| 7,200,678 B1 | 4/2007 | Bettadahalli et al. |
| 7,206,778 B2 | 4/2007 | Bode et al. |
| 7,209,880 B1 | 4/2007 | Gajic et al. |
| 7,212,807 B2 | 5/2007 | Laumen et al. |
| 7,213,260 B2 | 5/2007 | Judge |
| 7,224,778 B2 | 5/2007 | Aoki |
| 7,228,134 B2 | 6/2007 | Gandhi et al. |
| 7,228,334 B2 | 6/2007 | Jordan, Jr. |
| 7,233,803 B2 | 6/2007 | Nielsen et al. |
| 7,237,010 B2 | 6/2007 | Mora |
| 7,239,985 B1 | 7/2007 | Hysom et al. |
| 7,240,041 B2 | 7/2007 | Martin et al. |
| 7,240,355 B1 | 7/2007 | Eldering |
| 7,242,421 B2 | 7/2007 | Center, Jr. et al. |
| 7,242,493 B2 | 7/2007 | Hall et al. |
| 7,242,988 B1 | 7/2007 | Hoffberg et al. |
| 7,243,130 B2 | 7/2007 | Horvitz et al. |
| 7,353,034 B2 | 4/2008 | Haney |
| 2001/0037311 A1 | 11/2001 | McCoy et al. |
| 2001/0039522 A1 | 11/2001 | Saxon |
| 2002/0035536 A1 | 3/2002 | Gellman |
| 2002/0069200 A1 | 6/2002 | Cooper et al. |
| 2002/0083118 A1 | 6/2002 | Sim |
| 2002/0147645 A1 | 10/2002 | Alao et al. |
| 2002/0178086 A1 | 11/2002 | Margeson et al. |
| 2002/0178224 A1 | 11/2002 | Kasajima |
| 2003/0054839 A1 | 3/2003 | Ono |

| | | |
|---|---|---|
| 2003/0134616 A1 | 7/2003 | Thomsen et al. |
| 2003/0140235 A1 | 7/2003 | Immega et al. |
| 2003/0225850 A1 | 12/2003 | Teague |
| 2003/0236729 A1 | 12/2003 | Epstein et al. |
| 2004/0030550 A1 | 2/2004 | Liu et al. |
| 2004/0117326 A1 | 6/2004 | Amato |
| 2004/0117501 A1 | 6/2004 | Day et al. |
| 2004/0139000 A1 | 7/2004 | Amos |
| 2004/0139314 A1 | 7/2004 | Cook et al. |
| 2004/0180668 A1 | 9/2004 | Owens et al. |
| 2004/0220705 A1 | 11/2004 | Basir et al. |
| 2004/0243844 A1 | 12/2004 | Adkins |
| 2005/0136904 A1 | 6/2005 | Siddiqui |
| 2005/0154636 A1 | 7/2005 | Hildinger et al. |
| 2005/0177456 A1 | 8/2005 | Rossides |
| 2005/0186968 A1 | 8/2005 | Durst et al. |
| 2005/0188031 A1 | 8/2005 | Zandt |
| 2005/0188043 A1 | 8/2005 | Cortright et al. |
| 2005/0195076 A1 | 9/2005 | McCulloch et al. |
| 2005/0198054 A1 | 9/2005 | Sankaran |
| 2005/0233757 A1 | 10/2005 | Choi |
| 2005/0256769 A1 | 11/2005 | Rossides |
| 2006/0013368 A1 | 1/2006 | LaBaw |
| 2006/0018445 A1 | 1/2006 | Mittal |
| 2006/0047634 A1* | 3/2006 | Aaron et al. ............ 707/3 |
| 2006/0078122 A1 | 4/2006 | Dacosta |
| 2006/0101514 A1 | 5/2006 | Milener et al. |
| 2006/0161457 A1 | 7/2006 | Rapaport et al. |
| 2006/0178949 A1 | 8/2006 | McGrath |
| 2007/0070979 A1 | 3/2007 | Kim et al. |
| 2007/0262861 A1 | 11/2007 | Anderson et al. |
| 2008/0010106 A1 | 1/2008 | Bourne et al. |
| 2008/0014910 A1* | 1/2008 | Hsu et al. ............ 455/414.2 |
| 2008/0030322 A1 | 2/2008 | Stauffer et al. |
| 2008/0070593 A1 | 3/2008 | Altman et al. |
| 2008/0168074 A1 | 7/2008 | Inagaki |
| 2008/0214142 A1 | 9/2008 | Morin et al. |

OTHER PUBLICATIONS

FutureMe.org; bearing a date of Jan. 22, 2006; printed on Apr. 2, 2007; pp. 1-3; located at: http://futureme.org/public.php?id=218620.

Huang, Dawei; Liu, Fang; Shi, Xiangdong; Yang, Guangxin; Zheng, Ludi; Zhou, Zhiyu; "MapWeb: A Location-Based Converged Communications Platform"; Bell Labs Technical Journal; bearing a date of 2006; pp. 159-171; vol. 11, No. 1; Wiley Periodicals, Inc.; located at; www.interscience.wiley.com.

"Intro Writing Do's | Don'ts"; Happen Magazine—Match.com's advice center; printed on Apr. 4, 2007; pp. 1-2; located at: http://www.match.com/matchscene/tips.aspx?articleid=4511.

Khan, Omar; "Context and Context-Aware Computing"; Fall 2006; pp. 1-40; CS260.

McKinley, Philip K.; Padmanabhan, Udiyan I.; Ancha, Nandagopal; Sadjadi, Seyed Masoud; "Composable Proxy Services to Support Collaboration on the Mobile Internet"; IEEE Transactions on Computers; bearing a date of Jun. 2003; pp. 713-726; vol. 52, No. 6; IEEE Computer Society.

McKinley, Philip K.; Sadjadi, Seyed Masoud; Kasten, Eric P.; Cheng, Betty H.C.; "A Taxonomy of Compositional Adaptation"; Technical Report MSU-CSE-04/17; bearing a date of May 2004 and Jul. 2004; pp. 1-48; located at: http://www.cse.msu.edu/rapidware/survey.

Morris, John; Peterson, Jon; "Who's Watching You Now?"; IEEE Security & Privacy: Building Confidence in a Networked World; bearing a date of Jan.-Feb. 2007; pp. 76-79; vol. 5, No. 1; IEEE Computer Society.

"Oops!"; Match.com—Find Singles at the World's Largest Online Dating Personals Service; printed on Apr. 4, 2007; pp. 1-3; located at: http://www.match.com/profile/myprofile.aspx?sect=6.

"Open Source Rule Engines Written in Java"; Manageability; printed on May 2, 2007; pp. 1-7; located at: http://www.manageability.org/blog/stuff/rule_engines/view.

Terdiman, Daniel; "A Cure for E-Mail Attention Disorder?"; CNET News.com; bearing a date of Feb. 28, 2007; pp. 1-3; located at: http://news.com/A+cure+for+e-mail+attention+disorder/2100-.

* cited by examiner

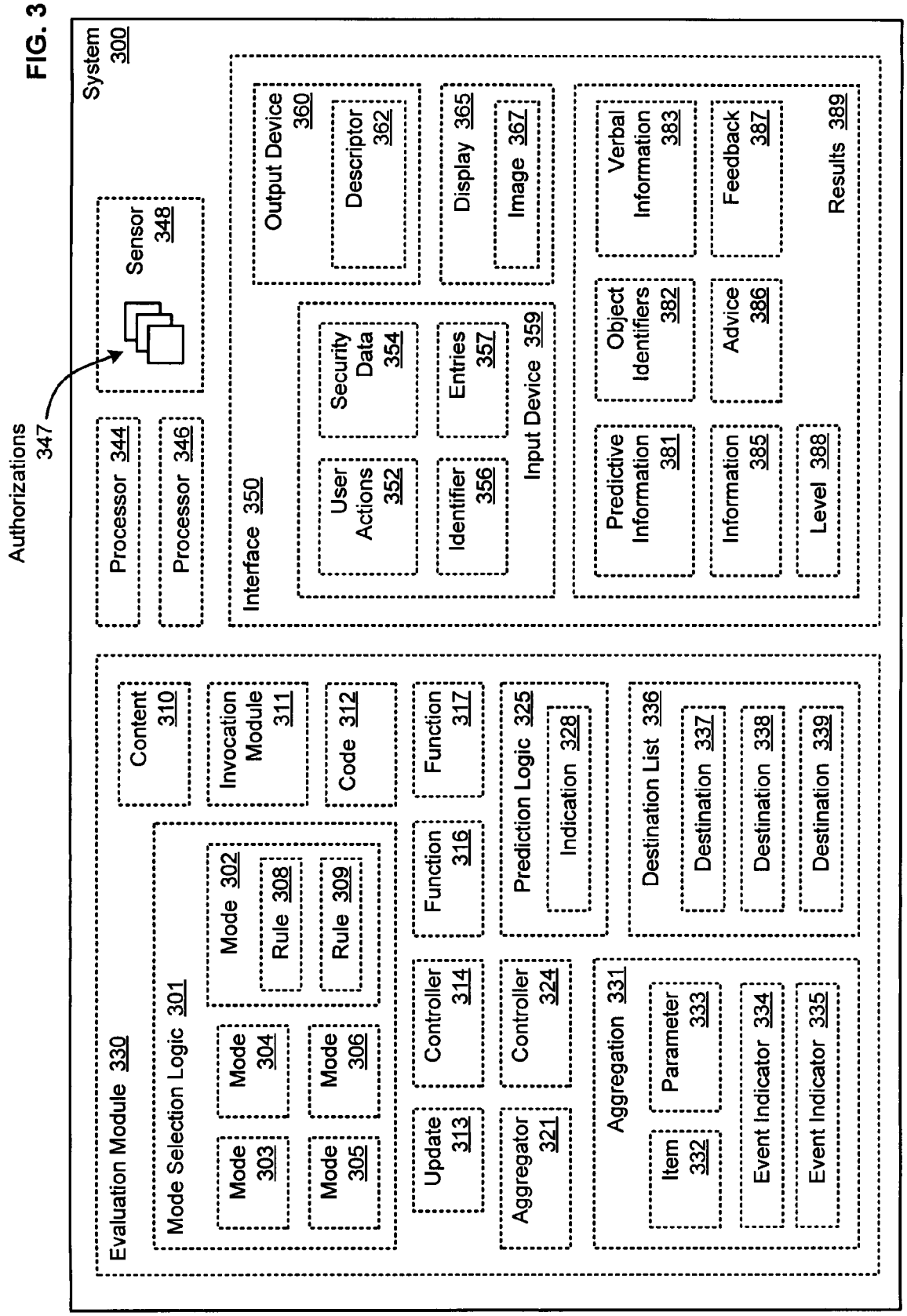

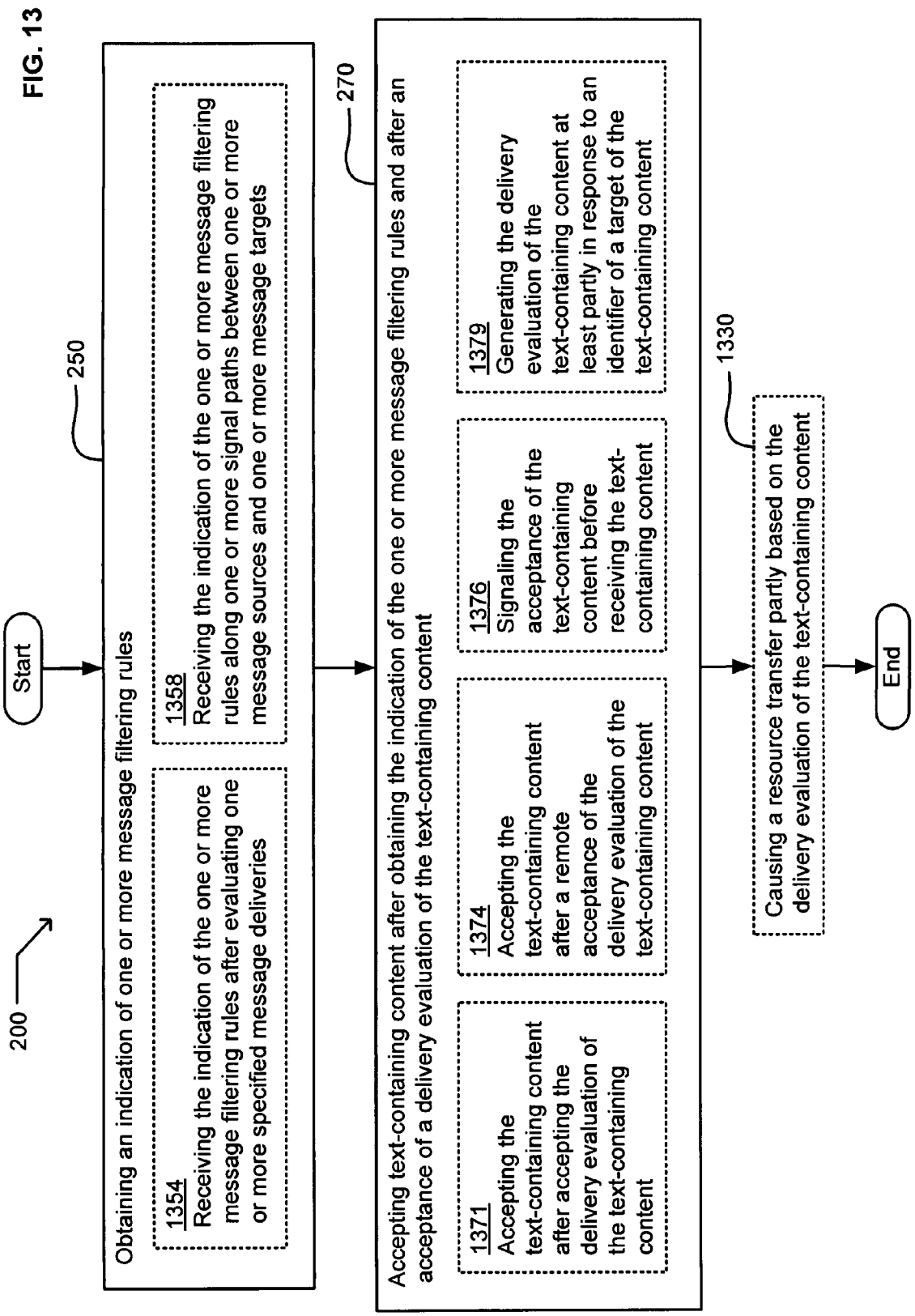

ADAPTIVE FILTERING OF ANNOTATED MESSAGES OR THE LIKE

SUMMARY

In one aspect, a method includes but is not limited to obtaining an indication of one or more message filtering rules and accepting text-containing content after obtaining the indication of the one or more message filtering rules and after a value acceptance of a delivery evaluation of the text-containing content. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for obtaining an indication of one or more message filtering rules and circuitry for accepting text-containing content after obtaining the indication of the one or more message filtering rules and after a value acceptance of a delivery evaluation of the text-containing content. In addition to the foregoing, other system aspects are described in the claims, drawings, and text forming a part of the present disclosure.

In addition to the foregoing, various other method and/or system and/or program product and/or physical carrier aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIGS. 3-11 depict other exemplary environments in each of which one or more technologies may be implemented.

FIGS. 12-13 depict variants of the flow of FIG. 2.

DETAILED DESCRIPTION

Figure 2:
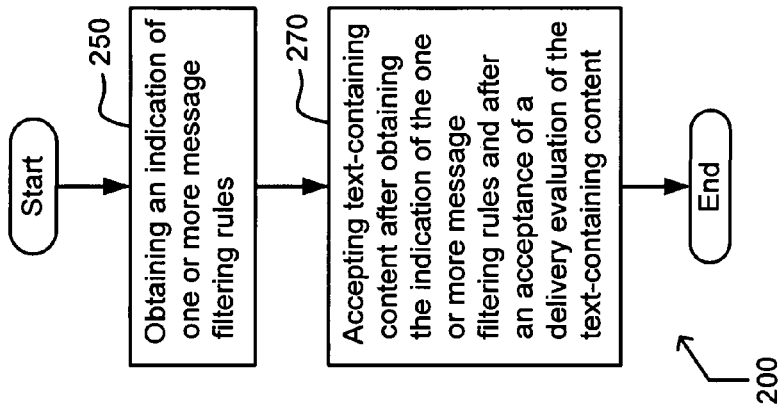
FIG. 2 depicts a high-level logic flow of an operational process.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In the following detailed description, reference is made to the accompanying drawings, which form a part hereof. The use of the same symbols in different drawings typically indicates similar or identical items. The illustrative embodiments described in the detailed description, drawings, and claims are not meant to be limiting. Other embodiments may be utilized, and other changes may be made, without departing from the spirit or scope of the subject matter presented here.

Following are a series of systems and flowcharts depicting implementations of processes. For ease of understanding, the flowcharts are organized such that the initial flowcharts present implementations via an initial "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 1:
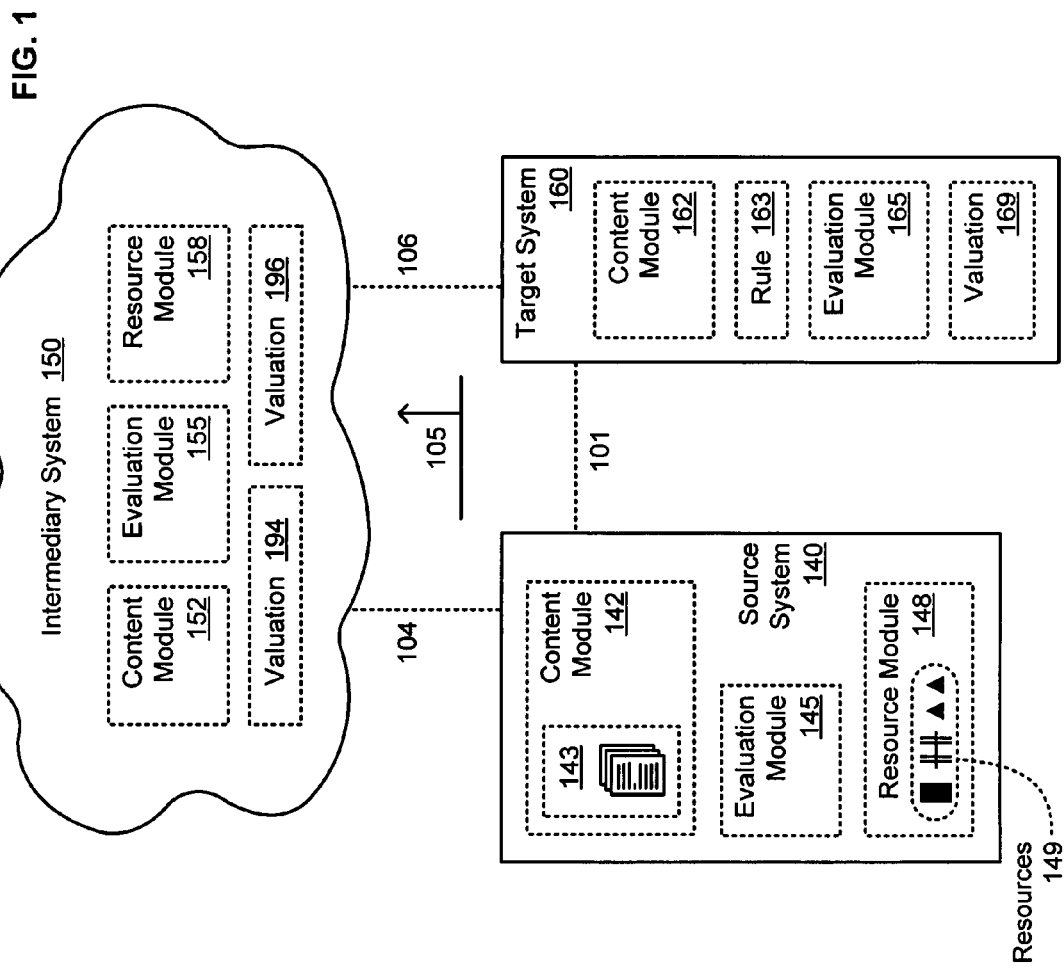
FIG. 1 depicts an exemplary environment in which one or more technologies may be implemented.

With reference now to FIG. 1, shown is an example of a system that may serve as a context for introducing one or more processes and/or devices described herein. As shown one or more instances of source system 140 may be operably coupled with one or more instances of target system 160, either directly (e.g. through passive-media linkage 101) or indirectly (e.g. via a data path 105 through intermediary system 150 and passive-media linkages 104, 106). Source system 140 may include one or more instances of content module 142 (e.g., with text-containing content 143), evaluation module 145, or resource modules 148, 158. Such resource module(s) 148, 158 may control one or more types of resources 149 such as storage or processing devices, access time on such devices, valuable data, reporting or other access services relating to such data, "credits" or similar artificial units of currency, communication services, accounts for tracking such items, or the like. Intermediary system 150 may likewise include one or more instances of content modules 152, evaluation modules 155, resource modules 158, as well as valuations 194, 196, optionally in an arrangement of data aggregators, a network, or some other distributed configuration. Target system 160 may also include one or more instances of content modules 162, message filtering rules 163 (e.g. expressed as a software configuration), evaluation modules 165, or valuations 169 as described below.

With reference now to FIG. 2, there is shown a high-level logic flow 200 of an operational process. Flow 200 includes operation 250—obtaining an indication of one or more message filtering rules (e.g. evaluation module 155 of intermediary system 150 receiving an indication of message filtering rule 163 or otherwise becoming aware of a message filtering rule that might affect a future delivery of content 143 to target system 160). For example, rule 163 may cause a delivery error message, a warning that content 143 is too long or is in an unacceptable format, an indication that content 143 is apparently unsuitable for one or more users of target system 160, or other indications as described herein. Alternatively or additionally, the indication may include a definition or summary of rule 163, an error message or other output from rule 163, a data aggregation indicating an installation of rule 163, or the like. Alternatively or additionally, one or more of evaluation modules 145, 155, 165 may receive an expression of the message filtering rule 163 as the indication. This may occur, for example, in embodiments in which one or more evaluation modules 145, 155 implement rule 163 to serve needs or preferences identified in association with target system 160, optionally in lieu of target system 160 implementing rule 163. See also U.S. patent application Ser. No. 11/821,077 ("Helping Valuable Message Content Pass Apparent Message Filtering") filed 19 Jun. 2007, also by Jung et al., incorporated by reference herein to the extent not inconsistent herewith.

Flow 200 further includes operation 270—accepting text-containing content after obtaining the indication of the one or more message filtering rules and after a value acceptance of a delivery evaluation of the text-containing content (e.g. evaluation module 155 accepting text-containing content 143 after accepting valuation 194 as sufficiently high for target system 160, and optionally after one or more phases or instances of operation 250). For example, such a conclusion may be obtained as a result of determining that valuation 196 is smaller than, or about equal to valuation 194, derived by or on behalf of target system 160. Alternatively, evaluation module 155 may optionally choose a value for valuation 196 arbitrarily between valuation 194 and valuation 169, in circumstances in which those two values are within about 20%. Other modes of arbitration are available to those skilled in the art, and may readily be implemented in evaluation module 155 in light of these teachings.

In other variants, evaluation module 145 or evaluation module 165 may likewise. measure valuations provided by the other against shortages, preferences, or other considerations that may affect a local valuation acceptance decision. In a circumstance in which target system 160 has a computational power shortage, for example, a computation-intensive delivery valuation (expressed in session minutes or computations, for example, that would be insufficient in a normal decision mode) may become acceptable. In some variants, source system 140 or target system 160 may thus experience such a shortage-mode or saturation-mode with regard to specific resources, or different modes with respect to each type of resource. Source system 140 may, for example, value a delivery to a class of target systems 160 to include an enhanced amount of storage access for each of several conditions present there: a storage-saturation mode, a delivery-shortage mode, or the like. Similar examples will be apparent to those skilled in the art in light of these teachings.

With reference now to FIG. 3, shown is an example of a system that may serve as a context for introducing one or more processes and/or devices described herein. System 300 may be implemented as a stand-alone or distributed system, as exemplified herein. As shown system 300 includes one or more instances of evaluation modules 330; processors 344; 346; sensors 348 effectively operable for receiving authorizations 347; or interfaces 350. Each valuation module 330 may include one or more instances of mode selection logic 301; content 310; invocation modules 311; code 312; updates 313; controllers 314, 324; functions 316, 317; aggregators 321; prediction logic 325 effectively operable for providing indications 328; aggregations 331; or destination lists 336 of one or more destinations 337, 338, 339. Each mode selection logic 301 may include one or more instances of modes 302, 303, 304, 305, 306 of which one or more may include one or more rules 308, 309. Each aggregation 331 may include one or more instances of items 332, parameters 333, or event indicators 334, 335. Each interface 350 may include one or more instances of input devices 359, output devices 360, displays 365 each operable for displaying one or more images 367, or results 389. Each keyboard, pointing device, microphone, image capture device, or other input device 359 may include one or more instances of user actions 352, security data 354, identifiers 356, or other entries 357 such as those described herein. Each output device may similarly include one or more descriptors 362. Each result may include one or more instances of predictive information 381, object identifiers 382, verbal information 383, information 385, advice 386, feedback 387, levels 388 or the like. Any such components may, of course, include other components such as those shown in FIGS. 4-13 and described below.

Figure 4:
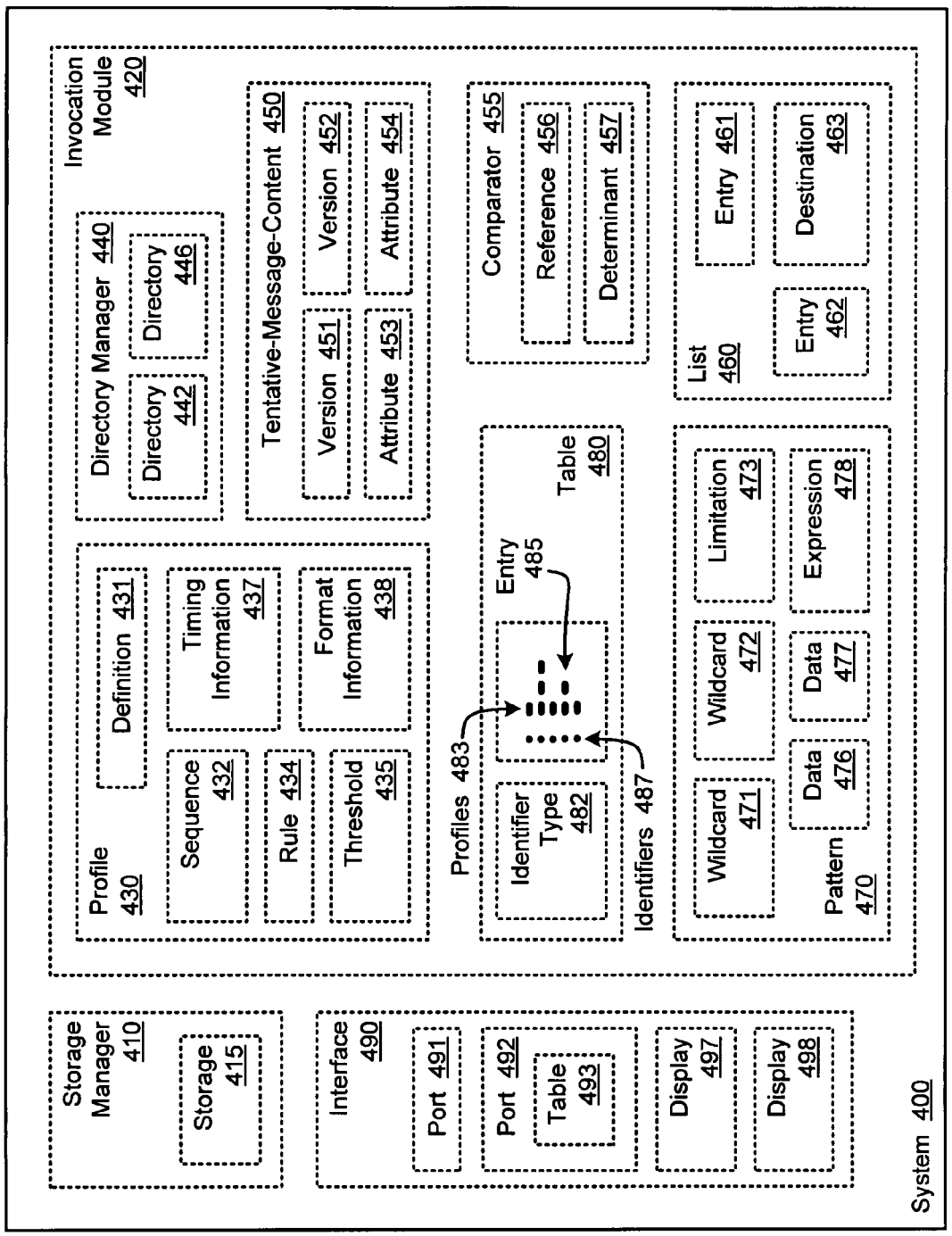

With reference now to FIG. 4, shown is an example of a system that may serve as a context for introducing one or more processes and/or devices described herein. System 400 may be implemented as a stand-alone or distributed system, as exemplified herein. As shown system 400 includes one or more instances of storage managers 410 operable for handling media as described herein (such as storage 415, for example), invocation modules 420, or interfaces 490. Each invocation module 420 may include one or more instances of profiles 430, directory managers 440, tentative-message-content 450, comparators 455, lists 460, patterns 470, or tables 480. Each profile 430 may include one or more instances of definitions 431, sequences 432, rules 434, thresholds 435, timing information 437, or format information 438. Directory manager 440 may access or otherwise include one or more directories 442, 446. Tentative-message-content 450 may include one or more instances of versions 451, 452 or attributes 453, 454. Each comparator 455 may include one or more instances of references 456 or other determinants 457. Each list 460 may include one or more instances of entries 461, 462 or destinations 463. Each pattern 470 may include one or more instances of wildcards 471, 472; limitations 473; data 476, 477; or expressions 478. Each table 480 may include one or more instance of identifier types 482 or profiles 483 associated with respective identifiers 487, for example, by inclusion in a common entry 485 as shown. Each interface 490 may include one or more instances of ports 491, 492 (optionally operable for handling table 493, for example) or displays 497, 498. Further information is provided below, especially with reference to FIGS. 12-13. Any such components may, of course, include other components such as those shown in FIGS. 5-13 and described below.

Figure 5:
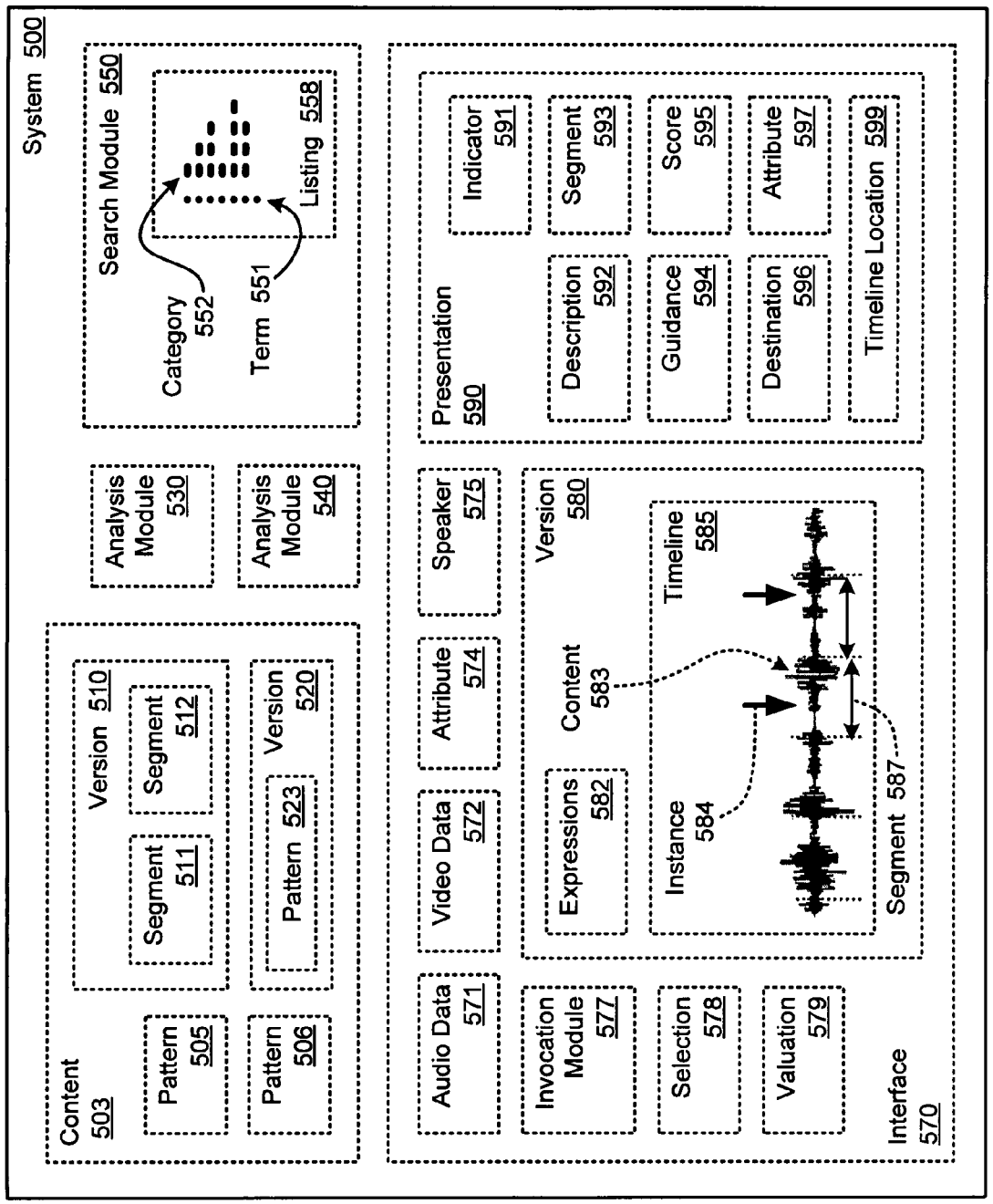

With reference now to FIG. 5, shown is an example of a system that may serve as a context for introducing one or more processes and/or devices described herein. System 500 may be implemented as a stand-alone or distributed system, as exemplified herein. As shown system 500 includes one or more instances of content 503; search modules 550 or other analysis modules 530, 540; or interfaces 570. Each instance of content 503 may include one or more instances of patterns 505, 506 or versions 510, 520. Each version 510 may include one or more segments 511, 512 and/or each version 520 may include one or more instances of patterns 523. Each search module 550 may include one or more instances of listings 558 mapping one or more terms 551 with one or more respective categories 552. Each interface 570 may include one or more instances of audio data 571, video data 572, attributes 574, speakers 575, invocation modules 577, selections 578, valuations 579, versions 580, or presentations 590. Each version 580 may include one or more instances of expressions 582 or timelines 585. Each timeline 585 may include one or more instances 584 (of expression 582 or other patterns, for example) within content 583 across a succession of time segments 587. Each presentation 590 may include one or more instances of indicators 591, descriptions 592, segments 593, guidance 594, scores 595, destinations 596, attributes 597, or timeline locations 599. Further information is provided below, especially with reference to FIGS. 12-13. Any such components may, of course, include other components such as those shown in FIGS. 6-11 and described below.

Figure 6:
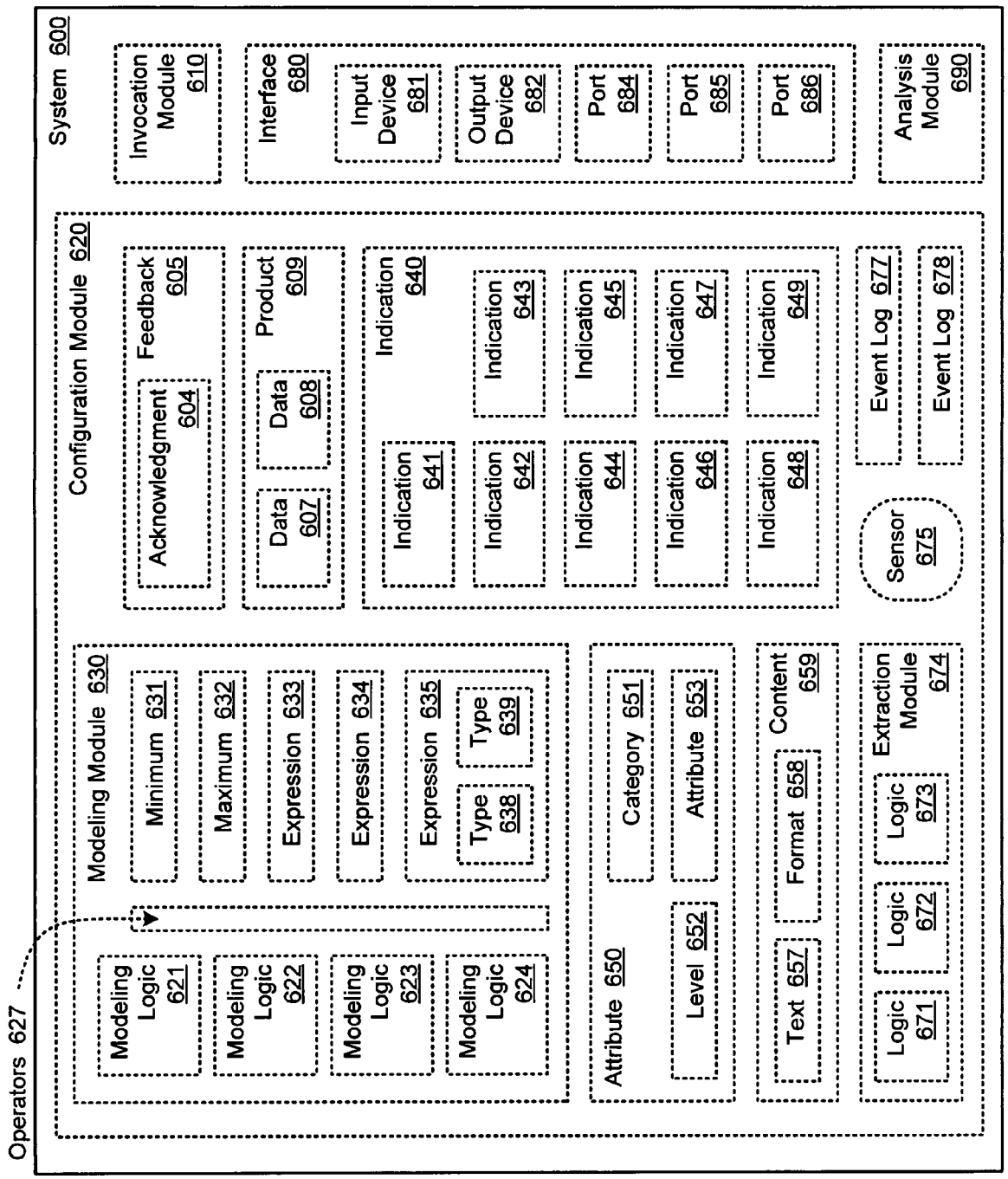

With reference now to FIG. 6, shown is an example of a system that may serve as a context for introducing one or more processes and/or devices described herein. System 600 may be implemented as a stand-alone or distributed system, as exemplified herein. As shown system 600 includes one or more instances of invocation modules 610, configuration modules 620, interfaces 680, or analysis modules 690. Each configuration module 620 may include one or more instances of acknowledgements 604 or other feedback 605; data 607, 608 or other products 609; modeling modules 630; indications 641, 642, 643, 644, 645, 646, 647, 648, 649 as described herein, within or among indications 640; categories 651, levels 652, or other attributes 653 within or among attributes 650; text 657, formats 658, or other content 659; extraction logic 671, 672, 673 of extraction modules 674, sensors 675, or event logs 677, 678. Each modeling module 630 may include one or more instances of modeling logic 621, 622, 623, 624; operators 627; minima 631; maxima 632; expressions 633, 634, 635 such as one or more types 638, 639. Each interface 680 may include one or more instances of input devices 681; output devices 682; or ports 684, 685, 686. Further information is provided below, especially with reference to FIGS. 12 & 13. Any such components may, of course, include other components such as those shown in FIGS. 7-11 and described below.

Figure 7:
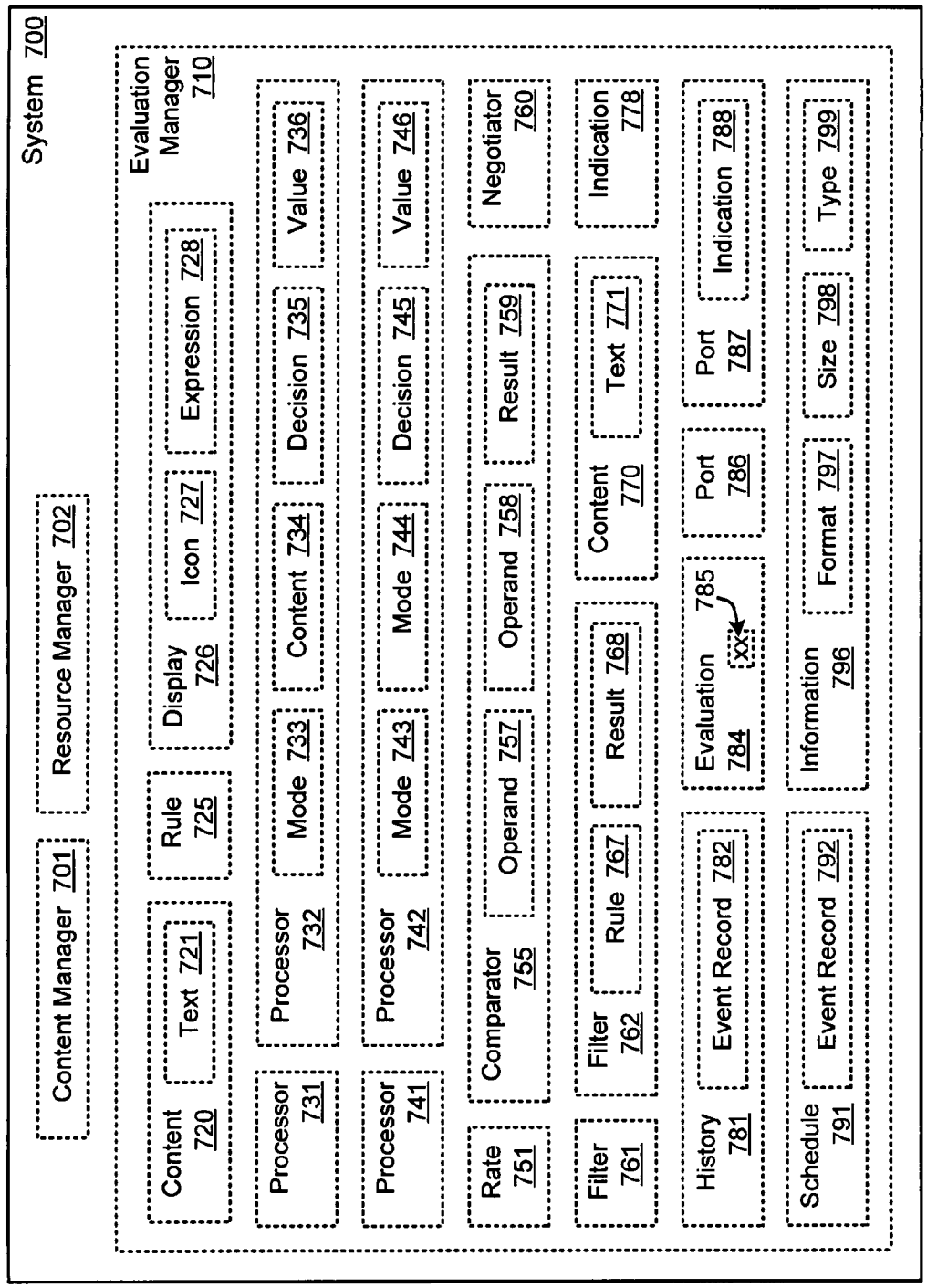

With reference now to FIG. 7, shown is an example of a system that may serve as a context for introducing one or more processes and/or devices described herein. System 700 may (optionally) be implemented as a stand-alone or distributed system, as exemplified herein. As shown system 700 includes one or more instances of content managers 701, resource managers 702, or evaluation managers 710. Each evaluation manager 710 may include one or more instances of text 721, 771 or other content 720, 770; rules 725; displays 726; processors 731, 732, 741, 742; rates 751, comparators 755, negotiators 760; filters 761, 762; indications 778; event records 782 or other elements of histories 781; scores 785 or other evaluations 784; ports 786, 787 operable for handling one or more indications 788; event records 792 or other elements of schedules 791; or information 796. Each display 726 may include one or more instances of icons 727 or other expressions 728. Each processor 732, 742 may include one or more instances of modes 733, 743, 744; content 734; decisions 735, 745; or other values 736, 746. Each comparator 755 may compare two or more instances of operands 757, 758 to generate one or more results 759. Each filter 762 may include one or more instances of rules 767 or results 768.

Each instance of information 796 may include one or more instances of formats 797, sizes 798, or types 799. Further information is provided below, especially with reference to FIGS. 12 & 13. Any such components may, of course, include other components such as those shown in FIGS. 8-11 and described below.

Figure 8:
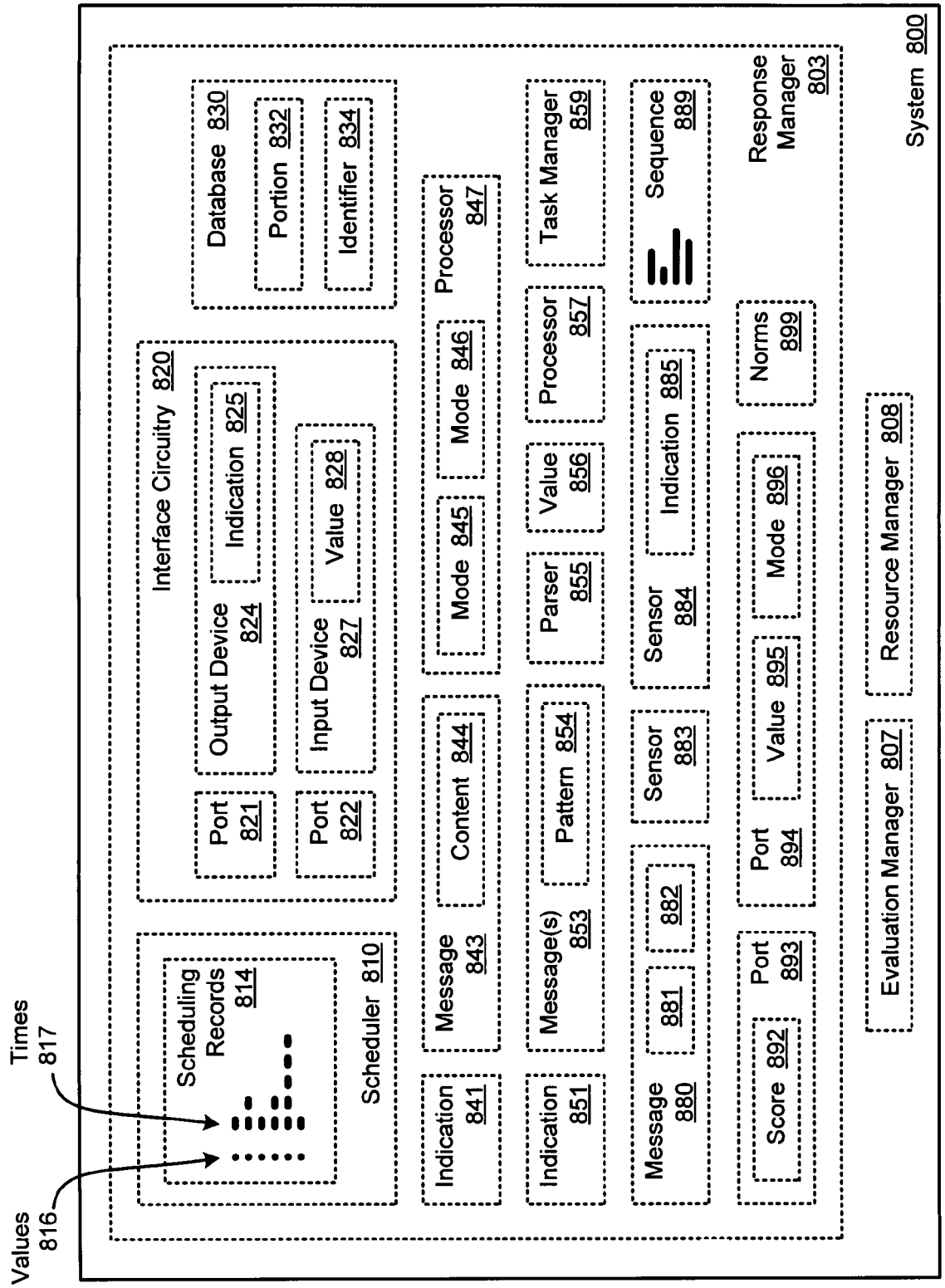

With reference now to FIG. 8, shown is an example of a system that may serve as a context for introducing one or more processes and/or devices described herein. System 800 may be implemented as a stand-alone or distributed system, as exemplified herein. As shown system 800 includes one or more instances of response managers 803, evaluation managers 807, or resource managers 808. Each response manager 803 includes one or more instances of schedulers 810; interface circuitry 820; databases 830; indications 841, 851; messages 843 containing content 844; patterns 854 or other useful objects of content in one or more messages 853; portions 881, 882 of a message 880; parsers 855; values 856; processors 847, 857 (optionally operable for using two or more modes 845, 846); task managers 859; sensors 883, 884 (optionally operable for detecting indications 885); sequences 889; ports 893, 894 operable for handling one or more scores 892, values 895, or modes 896; or norms 899. Each scheduler 810 may include one or more event descriptors or other such values 816 associated with one or more corresponding times 817, such as by inclusion in one or more common scheduling records 814. Each instance of interface circuitry 820 may include one or more instances of ports 821, 822; output devices 824 operable for transmitting indications 825; or input devices 827 operable for receiving values 828. Database 830 may comprise one or more portions 832, identifiers 834, or the like as described herein. Further information is provided below, especially with reference to FIGS. 12 & 13. Any such components may, of course, include other components such as those shown in FIGS. 9-11 and described below.

Figure 9:
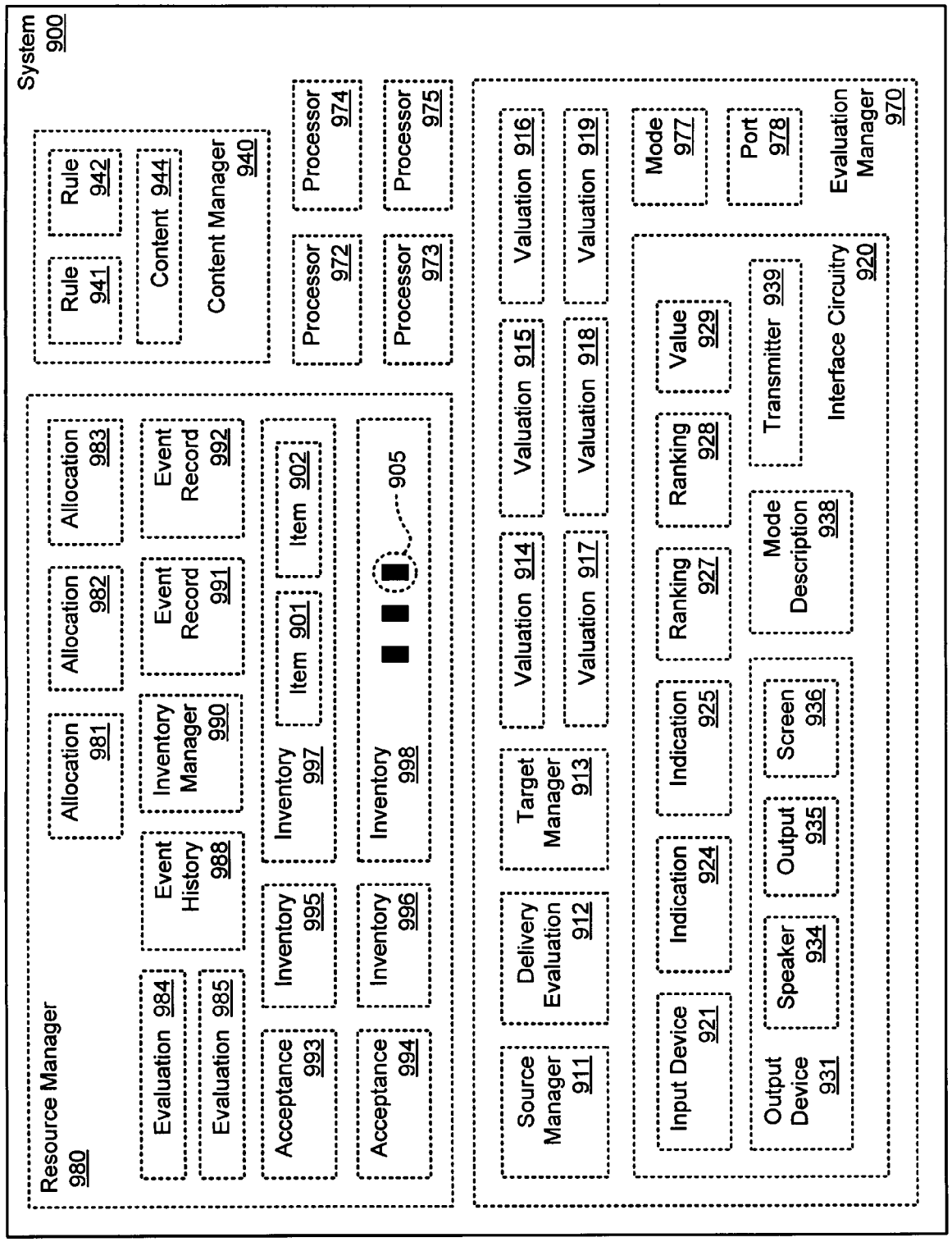

With reference now to FIG. 9, shown is an example of a system that may serve as a context for introducing one or more processes and/or devices described herein. System 900 may be implemented as a stand-alone or distributed system, as exemplified herein. As shown system 900 includes one or more instances of content managers 940 operable for handling rules 941, 942 or content 944; evaluation managers 970; processors 972, 973, 974, 975; or resource managers 980. Each evaluation manager 970 includes one or more instances of source managers 911; delivery evaluations 912; target managers 913; valuations 914, 915, 916, 917, 918, 919; interface circuitry 920; modes 977; or ports 978. Each interface circuitry 920 includes one or more instances of input devices 921; indications 924, 925; rankings 927, 928; values 929; outputs 935 handled by one or more instances of speakers 934, screens 936, or other output devices 931; mode descriptions 938; or transmitters 939. Each resource manager 980 includes one or more instances of allocations 981, 982, 983; evaluations 984, 985; event histories 988; inventory managers 990; event records 991, 992; acceptances 993, 994; inventories 995, 996, 997, 998 able to hold increments 905 or other items 901, 902. Further information is provided below, especially with reference to FIGS. 12 & 13. Any such components may, of course, include other components such as those shown in FIGS. 10-11 and described below.

Figure 10:
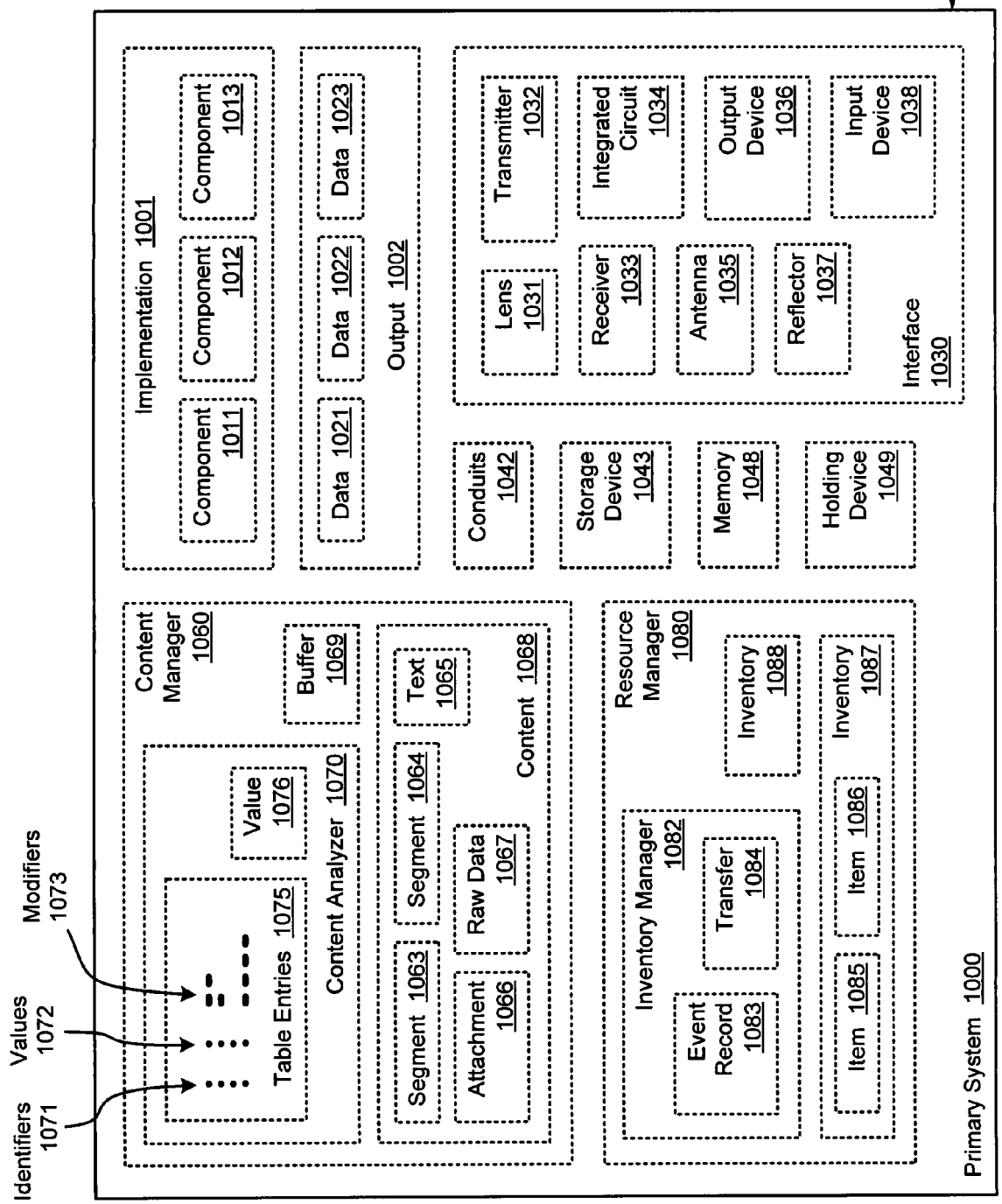

With reference now to FIG. 10, shown is an example of a system that may serve as a context for introducing one or more processes, systems or other articles described herein. Primary system 1000 may include one or more instances of implementations 1001 or outputs 1002 that may be held or transmitted by interfaces 1030, conduits 1042, storage devices 1043, memories 1048, other holding devices 1049, content managers 1060, resource managers 1080, or the like.

In various embodiments as described herein, for example, one or more instances of implementation components 1011, 1012, 1013 or implementation output data 1021, 1022, 1023 may each be expressed in any aspect or combination of software, firmware, or hardware as signals, data, designs, logic, instructions, or the like. The interface(s) 1030 may include one or more instances of lenses 1031, transmitters 1032, receivers 1033, integrated circuits 1034, antennas 1035, output devices 1036, reflectors 1037, input devices 1038, or the like for handling data or communicating with local users or with network 1090 via linkage 1050, for example. The content manager(s) 1060 may include one or more instances of content analyzers 1070 operable for handling values 1076 in various forms such as table entries 1075. Each table entry 1075 may comprise one or more instances of associations among identifiers 1071, values 1072, or modifiers 1073 as shown. Such content manager(s) 1060 may likewise include one or more instances of segments 1063, 1064, text 1065, attachments 1066, raw data 1067, or other content 1068, optionally in one or more buffers 1069. The resource manager(s) 1080 may include one or more items 1085, 1086 moveable among one or more inventories 1087, 1088, such as by one or more inventory managers 1082 operable for performing or tracking event records 1083, transfers 1084, or the like as shown. Several variants of primary system 1000 are described below with reference to one or more instances of repeaters 1091, communication satellites 1093, servers 1094, processors 1095, routers 1097, or other elements of network 1090.

Those skilled in the art will recognize that some list items may also function as other list items. In the above-listed types of media, for example, some instances of interface(s) 1030 may include conduits 1042, or may also function as storage devices that are also holding devices 1049. One or more transmitters 1032 may likewise include input devices or bidirectional user interfaces, in many implementations of interface(s) 1030. Each such listed term should not be narrowed by any implication from other terms in the same list but should instead be understood in its broadest reasonable interpretation as understood by those skilled in the art.

Several variants described herein refer to device-detectable "implementations" such as one or more instances of computer-readable code, transistor or latch connectivity layouts or other geometric expressions of logical elements, firmware or software expressions of transfer functions implementing computational specifications, digital expressions of truth tables, or the like. Such instances can, in some implementations, include source code or other human-readable portions. Alternatively or additionally, functions of implementations described herein may constitute one or more device-detectable outputs such as decisions, manifestations, side effects, results, coding or other expressions, displayable images, data files, data associations, statistical correlations, streaming signals, intensity levels, frequencies or other measurable attributes, packets or other encoded expressions, or the like from invoking or monitoring the implementation as described herein.

Referring again to FIG. 2, flow 200 may be performed by one or more instances of server 1094 remote from primary system 1000, for example, but operable to cause output device(s) 1036 to receive and present results via linkage 1050. Alternatively or additionally, device-detectable data 1022 may be borne by one or more instances of signal-bearing conduits 1042, holding devices 1049, integrated circuits 1034, or the like as described herein. Such data may optionally be configured for transmission by a semiconductor chip or other embodiment of integrated circuit 1034 that contains or is otherwise operatively coupled with antenna 1035 (in a radio-frequency identification tag, for example).

In some variants, some instances of flow 200 may be implemented entirely within primary system 1000, optionally configured as a stand-alone system. Operation 250 may be implemented by configuring component 1011 as logic for obtaining an indication of one or more message filtering rules, for example. This can be accomplished by including special-purpose instruction sequences or special-purpose-circuit designs for this function, for example, in optical or other known circuit fabrication operations, in programming by various known voltage modulation techniques, or otherwise as described herein or known by those skilled in the art. Output data 1021 from such a component in primary system 1000 or network 1090 may be recorded by writing to or otherwise configuring available portions of storage device(s) 1043.

Alternatively or additionally, such specific output data may be transmitted by configuring transistors, relays, or other drivers or conduits 1042 of primary system 1000 to transfer it to component 1012, for example. Component 1012 may perform operation 270 via implementation as logic for accepting text-containing content after obtaining the indication of the one or more message filtering rules and after a value acceptance of a delivery evaluation of the text-containing content, for example. Implementation output data 1022 from such a component in primary system 1000 or network 1090 may be recorded into available portions of storage device(s) 1043 or sent to component 1013, for example. Output 1002 from flow 200 may likewise include other data 1023 as described herein.

In some embodiments, output device 1036 may indicate an occurrence of flow 200 concisely as a decision, an evaluation, an effect, an hypothesis, a probability, a notification, or some other useful technical result. For example, such "indicating" may comprise such modes as showing, signifying, acknowledging, updating, explaining, associating, or the like in relation to any past or ongoing performance of such actions upon the common item(s) as recited. Such indicating may also provide one or more specifics about the occurrence: the parties or device(s) involved, a description of the method or performance modes used, any sequencing or other temporal aspects involved, indications of resources used, location(s) of the occurrence, implementation version indications or other update-indicative information, or any other such contextual information that may be worthwhile to provide at potential output destinations.

Concise indication may occur, for example, in a context in which at least some items of data 1021-1023 do not matter, or in which a recipient may understand or access portions of data 1021-1023 without receiving a preemptive explanation of how it was obtained. By distilling at least some output 1002 at an "upstream" stage (which may comprise integrated circuit 1034, for example, in some arrangements), downstream-stage media (such as other elements of network 1090, for example) may indicate occurrences of various methods described herein more effectively. Variants of flow 200, for example, may be enhanced by distillations described herein, especially in bandwidth-limited transmissions, security-encoded messages, long-distance transmissions, complex images, or compositions of matter bearing other such expressions.

In some variants, a local implementation comprises a service operable for accessing a remote system running a remote implementation. In some embodiments, such "accessing" may include one or more instances of establishing or permitting an interaction between the server and a local embodiment such that the local embodiment causes or uses another implementation or output of one or more herein-described functions at the server. Functioning as a web browser, remote terminal session, or other remote activation or control device, for example, interface(s) 1030 may interact with one or more primary system users via input and output devices 1036, 1038 so as to manifest an implementation in primary system 1000 via an interaction with server 1094, for example, running a secondary implementation of flow 200. Such local implementations may comprise a visual display supporting a local internet service to the remote server, for example. Such a remote server may control or otherwise enable one or more instances of hardware or software operating the secondary implementation outside a system, network, or physical proximity of primary system 1000. For a building implementing primary system 1000, for example, "remote" devices may include those in other countries, in orbit, or in adjacent buildings. In some embodiments, "running an implementation" may include invoking one or more instances of software, hardware, firmware, or the like atypically constituted or adapted to facilitate methods or functions as described herein. For example, primary system 1000 running an implementation of flow 200 may be a remote activation of a special-purpose computer program resident on server 1094 via an internet browser session interaction through linkage 1050, mediated by input device 1038 and output device 1036.

In some variants, some or all of components 1011-1013 may be borne in various data-handling elements—e.g., in one or more instances of storage devices 1043, in memories 1048 or volatile media, passing through linkage 1050 with network 1090 or other conduits 1042, in one or more registers or data-holding devices 1049, or the like. For example, such processing or configuration may occur in response to user data or the like received at input device 1038 or may be presented at output device 1036. Instances of input devices 1038 may (optionally) include one or more instances of cameras or other optical devices, hand-held systems or other portable systems, keypads, sensors, or the like as described herein. Output device(s) 1036 may likewise include one or more instances of image projection modules, touch screens, wrist-wearable systems or the like adapted to be worn while in use, headphones and speakers, eyewear, liquid crystal displays (LCDs), actuators, lasers, organic or other light-emitting diodes, phosphorescent elements, portions of (hybrid) input devices 1038, or the like.

A device-detectable implementation of variants described herein with reference to flow 200, for example, may be divided into several components 1011-1013 carried by one or more instances of active modules such as signal repeaters 1091, communication satellites 1093, servers 1094, processors 1095, routers 1097, or the like. For example, in some embodiments, component 1012 may be borne by an "upstream" module (e.g., repeater 1091 or the like) while or after component 1011 is borne in a "downstream" module (e.g., another instance of repeater 1091, communication satellite 1093, server 1094, or the like). Such downstream modules may "accept" such bits or other portions of implementation 1001 sequentially, for example, such as by amplifying, relaying, storing, checking, or otherwise processing what was received actively. Sensors and other "upstream" modules may likewise "accept" raw data, such as by measuring physical phenomena or accessing one or more databases.

In some embodiments, a medium bearing data (or other such event) may be "caused" (directly or indirectly) by one or more instances of prior or contemporaneous measurements, decisions, transitions, circumstances, or other causal determinants. Any such event may likewise depend upon one or more other prior, contemporaneous, or potential determinants, in various implementations as taught herein. In other words, such events may occur "in response" to both preparatory (earlier) events and triggering (contemporaneous) events in some contexts. Output 1002 may result from more than one component of implementations 1001 or more than one operation of flow 200, for example.

In some embodiments, such integrated circuits 1034 may comprise transistors, capacitors, amplifiers, latches, converters, or the like on a common substrate of a semiconductor material, operable to perform computational tasks or other transformations. An integrated circuit may be application-specific ("ASIC") in that it is designed for a particular use rather than for general purpose use. An integrated circuit may likewise include one or more instances of memory circuits, processors, field-programmable gate arrays (FPGA's), antennas, or other components, and may be referred to as a system-on-a-chip ("SoC").

In some embodiments, one or more instances of integrated circuits or other processors may be configured to perform auditory pattern recognition. In FIG. 10, for example, instances of the one or more input devices 1038 may include a microphone or the like operable to provide auditory samples in data 1021-1023. Some form or portion of such output may be provided remotely, for example, to one or more instances of neural networks or other configurations of remote processors 1095 operable to perform automatic or supervised speech recognition, selective auditory data retention or transmission, or other auditory pattern recognition, upon the samples. Alternatively or additionally such sound-related data may include annotative information relating thereto such as a capture time or other temporal indications, capture location or other source information, language or other content indications, decibels or other measured quantities, pointers to related data items or other associative indications, or other data aggregations or distillations as described herein.

In some embodiments, one or more instances of integrated circuits or other processors may be configured for optical image pattern recognition. In FIG. 10, for example, instances of lenses 1031 or other input devices 1038 may include optical sensors or the like operable to provide one or more of geometric, hue, or optical intensity information in data 1021-1023. Some form or portion of such output may be provided locally, for example, to one or more instances of optical character recognition software, pattern recognition processing resources, or other configurations of integrated circuits 1034 operable to perform automatic or supervised image recognition, selective optical data retention or transmission, or the like. Alternatively or additionally such image-related data may include annotative information relating thereto such as a capture time or other temporal indications, capture location or other source information, language or other content indications, pointers to related data items or other associative indications, or other data aggregations or distillations as described herein.

In some embodiments, one or more instances of integrated circuits or other processors may be configured to perform linguistic pattern recognition. In FIG. 10, for example, instances of input devices 1038 may include keys, pointing devices, microphones, sensors, reference data, or the like operable to provide spoken, written, or other symbolic expressions in data 1021-1023. Some form or portion of such output may be provided locally, for example, to one or more instances of translation utilities, compilers, or other configurations of integrated circuits 1034 operable to perform automatic or supervised programming or other language recognition, selective linguistic data retention or transmission, or the like. Alternatively or additionally such language-related data may include annotative information relating thereto such as a capture time or other temporal indications, capture location or other source information, language or other content indications, pointers to related data items or other associative indications, or other data classifications, aggregations, or distillations as described herein.

In some embodiments, one or more antennas 1035 or receivers 1033 may include a device that is the receiving end of a communication channel as described herein. For example, such a receiver may gather a signal from a dedicated conduit or from the environment for subsequent processing and/or retransmission. As a further example, such antennas or other receivers may include one or more instances of wireless antennas, radio antennas, satellite antennas, broadband receivers, digital subscriber line (DSL) receivers, modem receivers, transceivers, or configurations of two or more such devices for data reception as described herein or otherwise known.

In one variant, two or more respective portions of output data 1021-1223 may be sent from server 1094 through respective channels at various times, one portion passing through repeater 1091 and another through router 1097. Such channels may each bear a respective portion of a data aggregation or extraction, a publication, a comparative analysis or decision, a record selection, digital subscriber content, statistics or other research information, a resource status or potential allocation, an evaluation, an opportunity indication, a test or computational result, or some other output 1002 of possible interest. Such distributed media may be implemented as an expedient or efficient mode of bearing such portions of output data to a common destination such as interface 1030 or holding device 1049. Alternatively or additionally, some such data may be transported by moving a medium (carried on storage device 1043, for example) so that only a small portion (a purchase or other access authorization, for example, or a contingent or supplemental module) is transferred via linkage 1050.

In some embodiments, one or more instances of signal repeaters 1091 may include a device or functional implementation that receives a signal and transmits some or all of the signal with one or more of an altered strength or frequency, or with other modulation (e.g., an optical-electrical-optical amplification device, a radio signal amplifier or format converter, a wireless signal amplifier, or the like). A repeater may convert analog to digital signals or digital to analog signals, for example, or perform no conversion. Alternatively or additionally, a repeater may reshape, retime or otherwise reorder an output for transmission. A repeater may likewise introduce a frequency offset to an output signal such that the received and transmitted frequencies are different. A repeater also may include one or more instances of a relay, a translator, a transponder, a transceiver, an active hub, a booster, a noise-attenuating filter, or the like.

In some embodiments, such communication satellite(s) 1093 may be configured to facilitate telecommunications while in a geosynchronous orbit, a Molniya orbit, a low earth orbit, or the like. Alternatively or additionally, a communication satellite may receive or transmit, for example, telephony signals, television signals, radio signals, broadband telecommunications signals, or the like.

Figure 12:
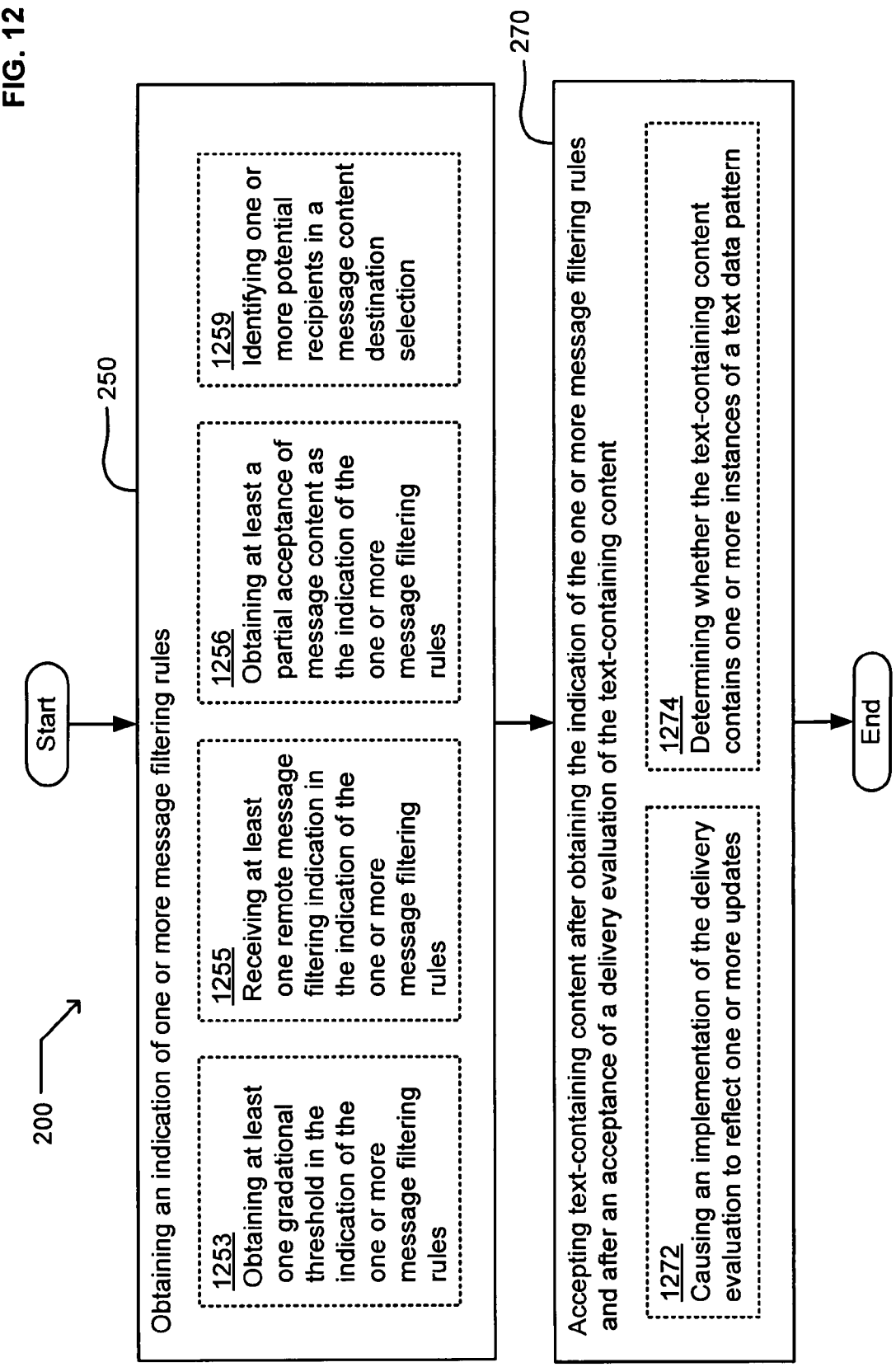

In some variants, processor 1095 or any components 1011-1013 of implementations 1001 may (optionally) be configured to perform flow variants as described herein with reference to FIGS. 12 & 13. An occurrence of such a variant can be expressed as a computation, a transition, or as one or more other items of data 1021-1023 described herein. Such output 1002 can be generated, for example, by depicted components of primary system 1000 or network 1090 including one or more features as described with reference to FIGS. 3-9.

Figure 11:
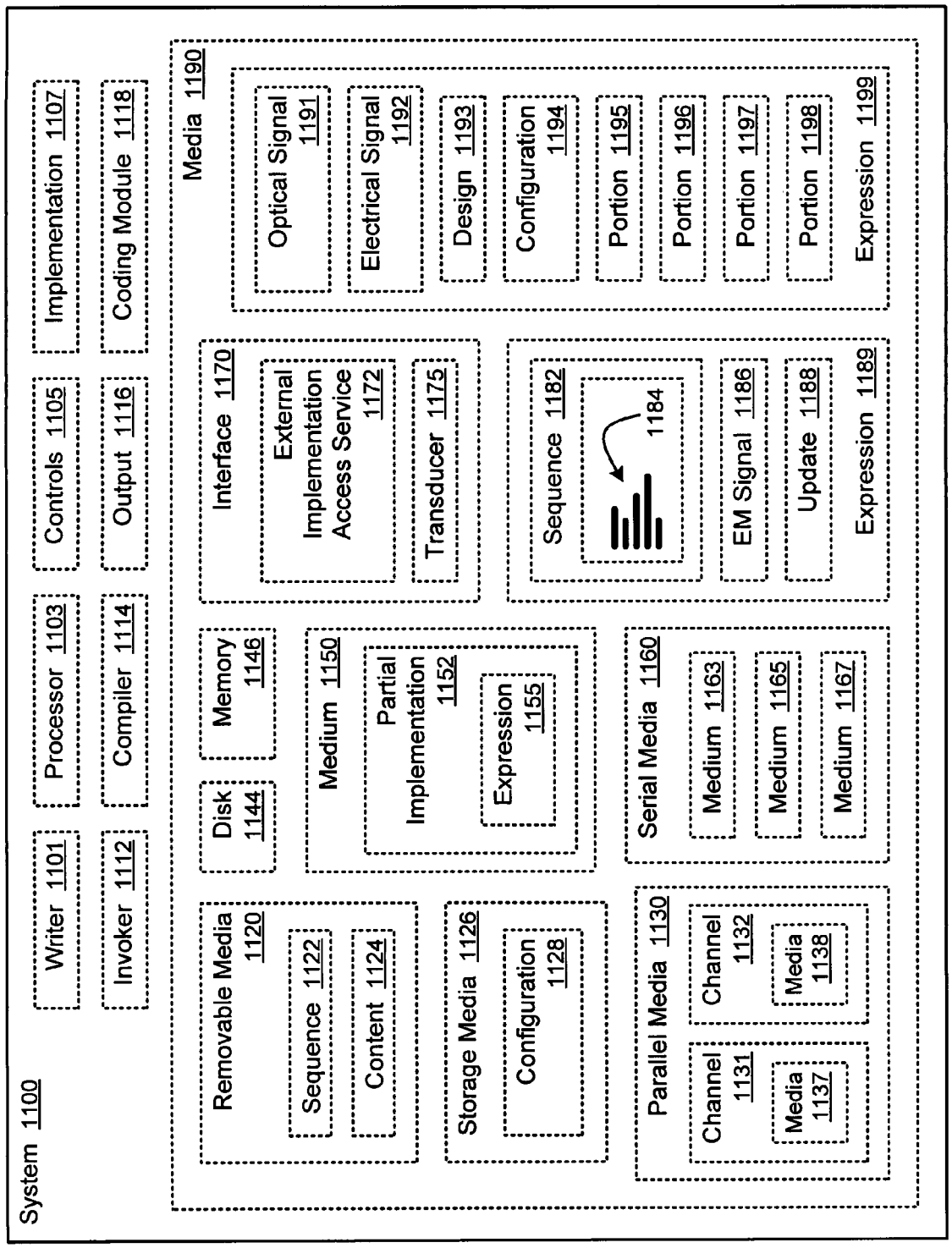

With reference now to FIG. 11, shown is an example of another system that may serve as a context for introducing one or more processes, systems or other articles described herein. As shown system 1100 comprises one or more instances of writers 1101, processors 1103, controls 1105, software or other implementations 1107, invokers 1112, compilers 1114, outputs 1116, coding modules 1118, or the like with one or more media 1190 bearing expressions or outputs thereof. In some embodiments, such media may include distributed media bearing a divided or otherwise distributed implementation or output. For example, in some embodiments, such media may include two or more physically distinct solid-state memories, two or more transmission media, a combination of such transmission media with one or more data-holding media configured as a data source or destination, or the like.

In some embodiments, transmission media may be "configured" to bear an output or implementation (a) by causing a channel in a medium to convey a portion thereof or (b) by constituting, adapting, addressing, or otherwise linking to such media in some other mode that depends upon one or more atypical traits of the partial or whole output or implementation. Data-holding elements of media may likewise be "configured" to bear an output or implementation portion (a) by holding the portion in a storage or memory location or (b) by constituting, adapting, addressing, or otherwise linking to such media in some other mode that depends upon one or more atypical traits of the partial or whole output or implementation. Such atypical traits may include a name, address, portion identifier, functional description, or the like sufficient to distinguish the output, implementation, or portion from a generic object.

In some embodiments described herein, "logic" and similar implementations can include software or other control structures operable to guide device operation. Electronic circuitry, for example, can manifest one or more paths of electrical current constructed and arranged to implement various logic functions as described herein. In some embodiments, one or more media are "configured to bear" a device-detectable implementation if such media hold or transmit a special-purpose device instruction set operable to perform a novel method as described herein. Alternatively or additionally, in some variants, an implementation may include special-purpose hardware or firmware components or general-purpose components executing or otherwise invoking special-purpose components. Specifications or other implementations may be transmitted by one or more instances of transmission media as described herein, optionally by packet transmission or otherwise by passing through distributed media at various times.

In some embodiments, one or more of the coding modules 1118 may be configured with circuitry for applying, imposing, or otherwise using a syntactic or other encoding constraint in forming, extracting, or otherwise handling respective portions of the device-detectable implementation or output. In encoding a software module or other message content, for example, compiler 1114 or coding module 1118 may implement one or more such constraints pursuant to public key or other encryption, applying error correction modes, certifying or otherwise annotating the message content, or implementing other security practices described herein or known by those skilled in the art. Alternatively or additionally, another instance of coding module 1118 may be configured to receive data (via receiver 1033, e.g.) and decode or otherwise distill the received data using one or more such encoding constraints. Compiler 1114 may, in some variants, convert one or more of components 1011-1013 from a corresponding source code form before the component(s) are transmitted across linkage 1050.

System 1100 may be implemented, for example, as one or more instances of stand-alone workstations, servers, vehicles, portable devices, removable media 1120, as components of primary system 1000 or network 1090 (of FIG. 10), or the like. Alternatively or additionally, media 1190 may include one or more instances of signal repeaters 1091, communication satellites 1093, servers 1094, processors 1095, routers 1097, portions of primary system 1000 as shown, or the like.

Media 1190 may include one or more instances of removable media 1120, tapes or other storage media 1126; parallel (transmission) media 1130; disks 1144; memories 1146; other data-handling media 1150; serial media 1160; interfaces 1170; or expressions 1189, 1199. Removable media 1120 can bear one or more device-detectable instances of instruction sequences 1122 or other implementations of flow 200, for example. Alternatively or additionally, in some embodiments, removable media 1120 can bear alphanumeric data, audio data, image data, structure-descriptive values, or other content 1124 in a context that indicates an occurrence of one or more flows 200. In some circumstances, transmission media may bear respective portions of implementations as described herein serially or otherwise non-simultaneously. In some variants in which two portions 1197, 1198 constitute a partial or complete software implementation or product of a novel method described herein, portion 1197 may follow portion 1198 successively through serial media 1163, 1165, 1167 (with transmission of portion 1197 partly overlapping in time with transmission of portion 1198 passing through medium 1163, for example). As shown, parallel channels 1131, 1132 are respectively implemented at least in media 1137, 1138 of a bus or otherwise effectively in isolation from one another. In some embodiments, a bus may be a system of two or more signal paths—not unified by a nominally ideal conduction path between them—configured to transfer data between or among internal or external computer components. For example, one data channel may include a power line (e.g., as medium 1165) operable for transmitting content of the device-detectable implementation as described herein between two taps or other terminals (e.g., as media 1163, 1167 comprising a source and destination). In another such configuration, one or more media 1137 of channel 1131 may bear portion 1197 before, while or after one or more other media 1138 of parallel channel 1132 bear portion 1198. In some embodiments, such a process may occur "while" another process occurs if they coincide or otherwise overlap in time substantially (by several clock cycles, for example). In some embodiments, such a process may occur "after" an event if any instance of the process begins after any instance of the event concludes, irrespective of other instances overlapping or the like.

In a variant in which a channel through medium 1150 bears an expression 1155 partially implementing an operational flow described herein, the remainder of the implementation may be borne (earlier or later, in some instances) by the same medium 1150 or by one or more other portions of media 1190 as shown. In some embodiments, moreover, one or more controls 1105 may configure at least some media 1190 by triggering transmissions as described above or transmissions of one or more outputs 1116 thereof.

In some embodiments, the one or more "physical media" may include one or more instances of conduits, layers, networks, static storage compositions, or other homogenous or polymorphic structures or compositions suitable for bearing signals. In some embodiments, such a "communication channel" in physical media may include a signal path between two transceivers or the like. A "remainder" of the media may include other signal paths intersecting the communication channel or other media as described herein. In some variants, another exemplary system comprises one or more physical media 1190 constructed and arranged to receive a special-purpose sequence 1182 of two or more device-detectable instructions 1184 for implementing a flow as described herein or to receive an output of executing such instructions. Physical media 1190 may (optionally) be configured by writer 1101, transmitter 1032, or the like.

In some embodiments, such a "special-purpose" instruction sequence may include any ordered set of two or more instructions directly or indirectly operable for causing multi-purpose hardware or software to perform one or more methods or functions described herein: source code, macro code, controller or other machine code, or the like. In some embodiments, an implementation may include one or more instances of special-purpose sequences 1182 of instructions 1184, patches or other implementation updates 1188, configurations 1194, special-purpose circuit designs 1193, or the like. Such "designs," for example, may include one or more instances of a mask set definition, a connectivity layout of one or more gates or other logic elements, an application-specific integrated circuit (ASIC), a multivariate transfer function, or the like.

Segments of such implementations or their outputs may (optionally) be manifested one or more information-bearing static attributes comprising the device-detectable implementation. Such attributes may, in some embodiments, comprise a concentration or other layout attribute of magnetic or charge-bearing elements, visible or other optical elements, or other particles in or on a liquid crystal display or other solid-containing medium. Solid state data storage modules or other such static media may further comprise one or more instances of laser markings, barcodes, human-readable identifiers, or the like, such as to indicate one or more attributes of the device-detectable implementation. Alternatively or additionally such solid state or other solid-containing media may include one or more instances of semiconductor devices or other circuitry, magnetic or optical digital storage disks, dynamic or flash random access memories (RAMs), or the like. Magnetoresistive RAMs may bear larger implementation or output portions or aggregations safely and efficiently, moreover, and without any need for motors or the like for positioning the storage medium.

Segments of such implementations or their outputs may likewise be manifested in electromagnetic signals 1186, laser or other optical signals 1191, electrical signals 1192, or the like. In some embodiments, for example, such electrical or electromagnetic signals may include one or more instances of static or variable voltage levels or other analog values, radio frequency transmissions or the like. In some embodiments, the above-mentioned "optical" signals may likewise include one or more instances of time- or position-dependent, device-detectable variations in hue, intensity, or the like. Alternatively or additionally, portions of such implementations or their outputs may manifest as one or more instances of magnetic, magneto-optic, electrostatic, or other physical configurations 1128 of nonvolatile storage media 1126 or as external implementation access services 1172.

In some embodiments, physical media can be configured by being "operated to bear" or "operated upon to bear" a signal. For example, they may include physical media that generate, transmit, conduct, receive, or otherwise convey or store a device-detectable implementation or output as described herein. Such conveyance or storing of a device-detectable implementation or output may be carried out in a distributed fashion at various times or locations, or such conveyance or storing of a device-detectable implementation or output may be done at one location or time. As discussed above, such physical media "operated to bear" or "operated upon to bear" may include physical media that are atypically constituted or adapted to facilitate methods or functions as described herein.

In some configurations, one or more output devices 1036 may present one or more results of obtaining an indication of one or more message filtering rules in response to interface(s) 1030 receiving one or more invocations or outputs of an implementation of this function via linkage 1050. Such an "invocation" may, in some embodiments, comprise one or more instances of requests, hardware or software activations, user actions, or other determinants as described herein. Alternatively or additionally, in some embodiments, one or more input devices 1038 may later receive one or more invocations or results of accepting text-containing content after obtaining the indication of the one or more message filtering rules and after a value acceptance of a delivery evaluation of the text-containing content. In contexts like these, processor 1095 or other components of network 1090 may likewise constitute a secondary implementation having access to a primary instance of interface 1030 implementing methods like flow 200 as described herein.

Serial media 1160 comprises a communication channel of two or more media configured to bear a transition or other output increment successively. In some embodiments, for example, serial media 1160 may include a communication line or wireless medium (e.g., as medium 1165) between two signal-bearing conduits (e.g., terminals or antennas as media 1163, 1167). Alternatively or additionally, one or more lenses 1031 or other light-transmissive media may comprise a serial medium between a light-transmissive medium and a sensor or other light receiver 1033 or transmitter 1032. In some embodiments, such "light-transmissive" media may (optionally) comprise metamaterials or other media operable for bearing one or more instances of microwave signals, radio-wave signals, visible light signals, or the like.

In some embodiments, such a lens may be an optical element that causes light to converge or diverge along one or more signal paths. Such a light-transmissive medium may include a signal-bearing conduit, glass, or other physical medium through which an optical signal may travel. More generally, a signal-bearing conduit may be an electrical wire, a telecommunications cable, a fiber-optic cable, or a mechanical coupling or other path for the conveyance of analog or digital signals.

Alternatively or additionally, system 1100 may likewise include one or more instances of media for handling implementations or their outputs: satellite dishes or other reflectors 1037, antennas 1035 or other transducers 1175, arrays of two or more such devices configured to detect or redirect one or more incoming signals, caching elements or other data-holding elements (e.g., disks 1144, memories 1146, or other media 1190), integrated circuits 1034, or the like. In some variants, one or more media may be "configured" to bear a device-detectable implementation as described herein by being constituted or otherwise specially adapted for that type of implementation at one or more respective times, overlapping or otherwise. Such "signal-bearing" media may include those configured to bear one or more such signals at various times as well as those currently bearing them.

In some embodiments, such caching elements may comprise a circuit or device configured to store data that duplicates original values stored elsewhere or computed earlier in time. For example, a caching element may be a temporary storage area where frequently-accessed data may be held for rapid access by a computing system. A caching element likewise may be machine-readable memory (including computer-readable media such as random access memory or data disks). In some embodiments, such caching elements may likewise comprise a latching circuit or device configured to store data that has been modified from original values associated with the data (held elsewhere or computed earlier in time, for example).

In one variant, respective portions 1195, 1196 of an expression 1199 of implementation 1107 may be sent through respective channels at various times. Invoker 1112 may request or otherwise attempt to activate a computer program or streaming media overseas via a telephone cable or other channel 1131. Meanwhile, output 1116 may attempt to trigger a session or other partial implementation 1152, success in which may be indicated by receiving expression 1155 into a visual display or other medium 1150. Such a program or other implementation may be made complete, for example, once both of these attempts succeed.

In some embodiments, transducer(s) 1175 may comprise one or more devices that convert a signal from one form to another form. For example, a transducer may be a cathode ray tube that transforms electrical signals into visual signals. Another example of a transducer comprises a microelectromechanical systems ("MEMS") device, which may be configured to convert mechanical signals into electrical signals (or vice versa).

With reference now to FIG. 12, and also to FIG. 7, there are shown several variants of flow 200 of FIG. 2. Operation 250—obtaining an indication of one or more message filtering rules—may be performed by port 787 and other portions of evaluation manager 710 receiving one or more indications 788 of rule 767, such as may be extracted from rule result 768. In a high-transaction-volume context, for example, such indications may be derived by testing a recent event record 782 against one or more hypotheses. These may include (a) that target system 160 has a higher-than-nominal inventory 1088 of resources; (b) that target system 160 has recently transferred resources at a higher-than-nominal average rate 751 (in terms of daily or weekly transactions or items, e.g.); (c) that target system 160 rarely makes transactions during certain daily intervals (e.g. at night) or during a meeting currently in progress, as indicated by one or more event records 792 of schedule 791; (d) that information 796 indicates that target system 160 may disfavor some content formats 797, sizes 798, or other types 799 (e.g. graphical data, attachments, or the like); (e) that one or more event records 782 of history 781 indicate that target system 160 recently rejected a delivery of content like that of current message currently under consideration; (f) that source system 140 currently has a higher-than-nominal valuation for any potential delivery to a class of destinations that include target system 160; (g) that source system 140 currently has a higher-than-nominal valuation for any potential delivery of content 770; or the like. From literal rule descriptions or such historical observations, for example, processor 742 may apply mode 744 for arithmetically or logically combining more than one of these factors in deriving or incrementally adjusting a value 746 for use as operand 757 or delivery evaluation. In some variants, for example, each of these factors may count for one point (or "item") if present, the sum of which being usable as the delivery evaluation or as an incremental change to a prior delivery evaluation. Those skilled in the art may readily practice many variants of this multi-factor analysis in light of teaching herein. Operation 250 may include one or more of the following operations: 1253, 1255, 1256, or 1259.

Operation 1253 describes obtaining at least one gradational threshold in the indication of the one or more message filtering rules (e.g. comparator 455 receiving minimum or maximum reference 456 for comparison with one or more determinants 457 each derived as a respective content attribute 453 of tentative-message-content version 451). This may occur, for example, in embodiments in which invocation module 420 performs operation 250. In some variants, for example, attribute 454 may indicate one or more instances of complexities, lengths, or other quantifiable measures of a corresponding version 452, any of which may be compared against a maximum acceptable value or range. Alternatively or additionally, development times, dimensions, or the like may likewise constitute attributes susceptible of use as or in generating a determinant suitable for comparison against a minimum and/or maximum acceptable value.

Operation 1255 describes receiving at least one remote message filtering indication in the indication of the one or more message filtering rules (e.g. modeling logic 622 receiving one or more indications 648 signifying that one or more remote instances of intermediary system 150 apparently rejects or otherwise disfavors content 659 that includes one or more types of script fonts, fine print, advertising, animation or other decorative features, or other non-standard attributes 653). This may occur, for example, in embodiments in which modeling module 630 performs operation 250 and in which target system 160 of FIG. 1 implements modeling module 630 and one or more other features of configuration module 620 of FIG. 6 as described herein. Alternatively or additionally, one or more other indications 644 may be used for favoring or disfavoring one or more attributes of audio data formatting; graphic formatting; language or other subject matter categories 651; trust, difficulty, or other levels 652; or the like. Other such indications 647 may likewise express favor or disfavor for file or other object size, slang, jargon, spelling or grammar errors, response types or times, target recipient attributes, or other aspects of apparent content treatment as described herein, at one or more such remote systems.

Alternatively or additionally, one or more instances of modeling logic 623 may be configured for receiving one or more wildcard-containing expressions 633, size-range-indicative minima 631 and maxima 632, or other expressions 635 of at least first data type 623 and next data type 624 respectively included and excluded in the operation of one or more remote systems, at least as estimated by modeling module 630). One or more such expressions 633-635 may each likewise associate with a corresponding inclusion or exclusion operator 627, moreover, at least in a context in which such operators are configurable. This may occur, for example, in embodiments in which one or more apparent content treatments affect all content types of one or more (included) type indications 643 except for one or more content types of (excluded) type indications 645. Alternatively or additionally, one or more instances of expressions 634 may indicate a size range, a group listing of two or more member identifiers, or the like.

Operation 1256 describes obtaining at least a partial content acceptance as the indication of the one or more message filtering rules (e.g. one or more sensors 883, 884 detecting that at least portion 881 of message 880 was accepted at one or more target systems 160, either from source systems 140 or otherwise, as one or more rule indications 885). This may occur, for example, in an embodiment in which source system 140 and/or intermediary system 150 implement a respective instance of response manager 803 configured to perform operation 250 and in which the portion has a common format (text sentences, for example) and other attributes likely to make the portion easy for a recipient to access. Alternatively or additionally, such sensors may optionally detect one or more instances of read receipts or other acknowledgments, partial rejection messages, warnings, reply-period timeouts, or the like. In some variants, alternatively or additionally, such a sensor may (optionally) aggregate message rejection data and the like for one or more specific recipients to generate, refine, and otherwise facilitate one or more models of apparent message filtering rules as described herein.

Operation 1259 describes identifying one or more potential recipients in a message content destination selection (e.g. directory manager 440 recognizing at least entry 461 and entry 462 of list 460 of user-designated recipients). Such recipients may be designated by a literal or logical identifier, an address, a relational descriptor (like "my father," "the manager of" a person or organization, "all users of" a system, etc.), or the like. This may occur, for example, in embodiments in which such recipients are initially unverified, irrespective of whether any such recipient has previously received any message content.

Operation 270—accepting text-containing content after obtaining the indication of the one or more message filtering rules and after a value acceptance of a delivery evaluation of the text-containing content—may be performed by processor 742 or other portions of evaluation manager 710 receiving content 770 containing text 771 as described herein, or presenting a decision 745 to accept it, after an occurrence of each of these events. The acceptance of the delivery evaluation may comprise result 759 indicating that operand 758 is acceptably within a minimum and/or maximum reference value of operand 757, for example, optionally before or during operation 250. In some embodiments, for example, comparator 755 may effectively implement a buying agent operable for accepting a low-enough offer or a selling agent operable for accepting a high-enough price offer. Alternatively or additionally, processor 742 may be configured to "accept" text 771 or other content 770 only after receiving and evaluation some or all of it. Operation 270 may include one or more of the following operations: 1272 or 1274.

Operation 1272 describes causing an implementation of the delivery evaluation to reflect one or more updates (e.g. maintenance controller 314 causing processor 344, function 316, or other components of system 300 to use mode 305 in response to one or more updates 313). This can occur, for example, in embodiments in which evaluation module 330 implements one or more components of evaluation manager 710 configured to perform preparatory or other phases of operation 270. In variants in which function 316 is partly implemented in software, for example, maintenance controller may add or change a portion of executable code in evaluation module 330 using such an update. Alternatively or additionally, in some variants, one or more other controllers 324 may indicate one or more such updates within results 389, via output device 360, or otherwise via interface 350.

Operation 1274 describes determining whether the text-containing content contains one or more instances of a text data pattern (e.g. search module 550 iteratively searching for words or other terms 551 of the tentative-message-content 503 within one or more listings 558 of topical associations or other categories 552). Different terms 551 of a common category 552 occurring two or more times in tentative-message-content 503, for example, may constitute a noteworthy attribute of the content 503 or of a segment 512 of the content 503. Such content or segment attributes can, for example, constitute a favored or disfavored element from the viewpoint of some recipients. This can occur, for example, in variants in which one or more portions of system 500 are configured to perform operation 270, for example, responsive to invocation module 577 or other structures described herein performing operation 250.

With reference again to FIG. 13, there are shown several variants of the flow 200 of FIG. 2 or FIG. 12. Operation 250—obtaining an indication of one or more message filtering rules—may include one or more of the following operations: 1354 or 1358. Operation 270—accepting text-containing content after obtaining the indication of the one or more message filtering rules and after a value acceptance of a delivery evaluation of the text-containing content—may include one or more of the following operations: 1371, 1374, 1376, 1379. In some variants, flow 200 may likewise include one or more instances of operation 1330.

Operation 1354 describes receiving the indication of the one or more message filtering rules after evaluating one or more specified message deliveries (e.g. filter 762 receiving an embodiment or other indication of rule 767 after content analyzer 1070 evaluates a potential delivery of one or more segments 1063, 1064 of content 1068). This may occur, for example, in an embodiment in which content analyzer 1070 looks up values 1072 corresponding to corresponding destination identifiers 1071 for the segment(s) 1063, 1064 of the potential delivery, in which component 1011 instantiates filter 762 or other portions of evaluation manager 710, and in which component 1011 performs operation 250. Optionally, content analyzer 1070 may potentially adjust one or more of the value(s) 1072 by one or more corresponding modifiers 1073, which may vary as a function of the time of day, a recipient's schedule, an event record, or other potential determinants of a message sender's preferences.

Operation 1358 describes receiving the indication of the one or more message filtering rules along one or more signal paths between one or more message sources and one or more message targets (e.g. port 786 of evaluation module 155 receiving one or more instances or indications of rule 725 from or about one or more instances of target system 160). This may occur, for example, in a configuration in which intermediary system 150 is situated along signal path 105 between source system 140 and target system 160 as shown, in which rule 725 is received from evaluation module 165, and in which rule(s) 767 comprise(s) one or more instances of message filtering rules as exemplified herein. In some variants, one or more instances of evaluation module 155 may be configured to apply the rule or to facilitate a more complex decision phase. For example, negotiator 760 for source system 140 or the like may decide whether to signal content manager 1060 to comply with the rule, whether to forego delivery to target system 160, whether to attempt delivery of potentially compliant content, whether to evaluate delivery to target system 160 in terms of one or more resources, whether to change a decision in light of a delivery failure, or the like as described herein. Alternatively, processor 741 may (optionally) be configured to derive rule 725 as a model or other approximation of a rule that target system 160 may impose or expect application upon incoming messages from source system 140.

Operation 1371 describes accepting the text-containing content after accepting the delivery evaluation of the text-containing content (e.g. processor 732 signaling an affirmative decision 735 to accept text containing content 734 "sight unseen," derived by evaluation mode 733 in response to or otherwise after decision 735 indicates that value 736 is suitable for evaluation manager 710). This may likewise occur, for example, in a context in which decision 735 is made by processor 732 instead, to accept the delivery evaluation based upon factors that are independent of the text-containing content 734 as described herein. Alternatively or additionally, in some embodiments, processor 732 may be configured so that later-obtained instances of decisions 735 may depend upon respective evaluations of earlier-received text-containing content 734

Operation 1374 describes accepting the text-containing content after one or more remote entities accept the delivery evaluation of the text-containing content (e.g. a local instance of processor 731 accepting at least text 771 of content 770 after port 787 locally receives indication 778 that an instance of target system 160 remotely signaled an authorized acceptance of score 785). This may occur, for example, at an instance of (intermediary) evaluation module 155 or (source) evaluation module 145 implementing portions of evaluation manager 710. Alternatively or additionally, an instance of evaluation manager 710 may be configured to perform operation 1374 locally at evaluation module 165. This may occur, for example, in embodiments in which operation 250 is performed by port 787 and in which operation 270 is performed by one or more other portions of evaluation manager 710 as described herein.

Operation 1376 describes signaling an acceptance of the text-containing content before receiving a last portion of the text-containing content (e.g. content manager 1060 accepting content 1068 on behalf of target system 160 before either receives content 770). This may occur, for example, in a context in which text 771 (of FIG. 7) or other content is instantiated in one or more content modules 142, 152 (of FIG. 1) received by an instance of content manager 1060 via a network containing systems like those of FIG. 1. It may result from one or more of a higher-than-nominal value of the delivery evaluation, a higher-than-nominal trust level for source system 140, a characterization or other certification from a target-designated information source, a low-enough level of loading within content target, or other such detectable conditions that may influence a content target's configuration preferences. Alternatively or additionally, acceptances of such content may occur incrementally or after receiving the text-containing content.

Operation 1379 describes generating the delivery evaluation of the text-containing content at least partly in response to an identifier of a target of the text-containing content (e.g. content analyzer 1070 computing one or more instances of value 1076 of delivering corresponding content 1068 to one or more instances of target system 160 as a function of one or more identifiers 1071 each representing a corresponding system). This may occur, for example, by assigning a pro rata value for each distinct target (system or person), for each unit of content delivered to any of a set of selected targets, or by some more complex system of valuation. Alternatively or additionally, additional instances of table entries 1075 may apply, for example, to effectuate one or more instances of surcharges, bonuses, presentation effects, or other modifiers 1073 conditionally or otherwise affecting one or more values 1072 associated with each of identifiers 1071.

In some embodiments, for example, modifiers 1073 or other services may directly or indirectly indicate one or more valuations 194, 196 (of FIG. 1) implicitly or explicitly. In a context in which a user of target system 160 receives a text-containing message (e.g. content 143) not compliant with one or more instances of rule 163, for example, an atypical evaluation of the delivery could be indicated by a value-indicative symbol (like "±" or some other ASCII character, for example)

or other icon 727 on a display 726. Such an icon could be enhanced by some more explicit expression 728 of the delivery evaluation when selected by a user at target system 160, for example, who could then indicate an acceptance of the delivery evaluation (via an "approve" control activation or the like). Alternatively or additionally, (intermediate) evaluation module 155 may be configured to forward such items to target system 160 at recipient-selected times or under recipient-specified circumstances, at least partly based on one or more rules 163 being relaxed or removed by the delivery evaluation acceptance.

During or after operation 270, a variety of techniques may be used to link a transfer of resources (from resource modules 148, 158 or the like) with the content acceptance. In some embodiments, a message containing the content may likewise include an attachment or other code configured to "report back" information relating to events involving the content: content acceptance, interaction time, compliance with terms, or the like. Alternatively or additionally, a service provider or other intermediary system 150 could check items and monitor or even enforce any terms relating to the delivery evaluation acceptance (e.g. by holding, forwarding, delaying, or modifying subsequent messages until after receiving an assurance of compliance). For example, in a context in which "user A" has issued urgency-indicative "tokens" manifesting a preference that a message reaches user A expediently, intermediary system 150 could then use a priori information about user A's location and any instances of target system 160 able to access user A. Alternatively or additionally, the use of such a token may be coupled with one or more additional consequences to entice compliance, such as by postponing delivery of other messages (with fewer tokens or no tokens, for example) until a later time. Alternatively or additionally, a similar urgency status may likewise be applied to any messages from a recipient-specified list, or any that a recipient-specified sender designates as urgent.

In some embodiments, a third party might issue tokens function as a brokerage for such resources. A first party might issue items to the third party, for example, in a context in which the third party is free to distribute such resources in exchange for other resources or the like. Such a third party (acting through intermediary system 150 or target system 950, for example) may limit such exchanges only among a given population of exchange members, for example, in some implementations.

Operation 1330 describes causing a resource transfer at least partly based on the delivery evaluation of the text-containing content (e.g. inventory manager 1082 implementing one or more transfers 1084 of a quantity of items 1085, 1086 equal to or otherwise based on score 785 or other evaluation 784 from inventory 1087 to inventory 1088). This may occur, for example, in a context in which one or more instances of resource modules 148, 158 of FIG. 1 contains one or more instances of resource managers 1080, in which inventory 1088 is owned by or otherwise associated with an instance of target system 160, in which one or more such transfers 1084 are each recorded in a respective event record 1083, and in which the delivery evaluated is the prospective delivery of content 143 to target system 160. Alternatively or additionally, the "delivery" may include a component within target system 160, such as a delivery to a specific user, for a specific duration, before a specific deadline, in a specific format, by a specific mode, or the like (e.g., by some combination of these). In some variants, operation 1330 may be performed by resource manager 1080 causing one or more items 1085, 1086 to move out of an account or other inventory 1087 (or into inventory 1088) based on a result 759 derived from operand 758 as described above. Alternatively or additionally, such resource transfers may be caused by one or more valuations 169, 196 expressing one or more other attributes of source system 140, target system 160, content 143, resource module 148, or the like as illustrated herein.

Referring again to FIG. 2, flow 200 may be performed by one or more instances described above with reference to FIGS. 1-11. In certain variants in which some of the above-described components participate in the performance of operation 250, for example, one or more evaluation manager 970 and/or other evaluation modules 155, 165 may perform preliminary potential delivery evaluations of a message in draft at source system 140.

Alternatively or additionally, one or more components of evaluation manager 970 may receive an acceptance, for example, indicating that such evaluation module(s) 165 deem the message at least partly acceptable. Other such components may likewise receive one or more gradational thresholds 435, one or more potential or other destinations 338 identifying one or more target systems 160, and/or other such components of the message(s) indicating attributes or outcomes of the message filtering rule(s). In embodiments in which source system 140 or intermediary system 150 implement respective components evaluation managers 970, for example, such data about the filtering rule(s) may be received into evaluation modules 155 along one or more signal paths 105 between source system 140 and target system 160.

In some contexts, the selection one or more (potential) recipients and/or the draft may change, triggering periodic or other occasional updates in these evaluations. Alternatively or additionally, maintenance controller 314 may cause updates to one or more of the evaluation implementations, which may affect subsequent or contemporaneous valuations.

In some variants, evaluation module 155 may evaluate a potential delivery of a specific message to systems A and B by adding the value of delivering the message to A to the value of delivering the message to B, based on a size-indicative text portion of the message. In others, evaluation module 155 may be configured to recognize or implicitly account for an apparent similarity between systems A and B or other economies of scale by generating a lower value. Record counts, time intervals, or other resource indications may likewise constitute a text data pattern useful for such evaluation modules.

Alternatively or additionally, in some contexts, content module 152 may be configured to receive a remainder of the message, optionally irrespective of such evaluations. In some variants, resource module 158 is configured to authorize, cause, or otherwise signal a resource transfer (denoting an acceptance of the text-containing content, for example) as described above if and only (a) if evaluation module 165 indicates that one or more such target systems 160 accept the delivery evaluation and (b) if the delivery evaluation is within an acceptable range.

Referring again to FIG. 3 and also to FIG. 12, any of the implementations described above with reference to FIGS. 1-11 may (optionally) likewise include one or more instances of maintenance controller 314, processor 344, and/or other circuitry for causing an implementation of the delivery evaluation to reflect one or more updates as exemplified above. This can occur in embodiments in which such instances are implemented in a source system 140, intermediary system 150, or target system 160 containing one or more instances of evaluation module 330 operable for performing operation 250, for example, alone or in combination with other circuitry described herein.

Alternatively or additionally, any of such implementations may likewise include one or more instances of a general-purpose processor in mode 302 and/or other circuitry configured for applying at least one of the one or more message filtering rules in a default mode. Such circuitry may be configured to implement one or more special-purpose software instructions configured for applying one or more rules 309 as described herein, for example. This can occur in embodiments in which one or more evaluation modules 330 are operable for performing operation 270, for example, in conjunction with one or more interfaces 350, 490, 570, 680, 1030, 1170 described herein.

Referring again to FIG. 4, any of the implementations described above with reference to FIGS. 1-11 may likewise include one or more instances of comparator 455 or other circuitry for receiving, retaining, or applying gradational thresholds in message filtering rule indications, as exemplified above. This can occur in embodiments in which such instances are implemented in analog, software, or other such determinant forms in the various phases or instances of operation 250 described herein.

Any of such implementations may (optionally) likewise include one or more instances of directory manager 440 or other circuitry for receiving a remote message filtering indication in the indication of the one or more message filtering rules as exemplified above. This can occur in embodiments in which such indications from some destinations are likewise inferred with respect to other destinations in common group or having some other common attributes, for example, or in which such indications affect inquiries or default conditions relating to such other destinations. Alternatively or additionally, one or more instances of invocation 420 may be configured to attempt or otherwise facilitate such preparatory or other phases of operation 250 as described herein.

Referring again to FIG. 6, any of the implementations described above with reference to FIGS. 1-11 may likewise include one or more instances of modeling logic 621, 622 or other circuitry for receiving a remote message filtering indication in the indication of the one or more message filtering rules as exemplified above. This can occur in embodiments in which such instances function iteratively and/or continuously, for example, and/or in which they perform only once during operation 250.

Referring again to FIG. 5 and/or FIG. 7, any of the implementations described above with reference to FIGS. 1-11 may likewise include one or more instances of search module 550, a counter, filter 762 and/or other circuitry for determining whether content contains instances of strings or other text data patterns as exemplified above, or how many, when, or where such instances are encountered. This can occur in embodiments in which such instances favor message transmission, for example, such as by relating to a target's thematic or other zone of interest. Alternatively or additionally, some such identifiable terms 551 may prevent transmission and/or lead to some other such result 768, for example, such as by relating to an explicit or implicit exclusion zones in respective phases of variants of operation 270 as described herein.

Alternatively or additionally, any of the implementations described above with reference to FIGS. 1-11 may likewise include one or more instances of port 786, a signal-bearing conduit, or some other circuitry for receiving the indication of the one or more message filtering rules along one or more signal paths between one or more message sources and one or more message targets as exemplified above. This can occur in embodiments in which such instances exist within a source system or target system, for example, or at some other suitable location described above with reference to or other applicability to operation 250.

Any of such implementations may (optionally) likewise include one or more instances of processor 732 operating in evaluation mode 733, an application-specific integrated circuit (ASIC), or other such circuitry operable for accepting text-containing content at some time after accepting one or more delivery evaluations of the text-containing content as exemplified above. This can occur in embodiments in which such instances are implemented within a remote or local system, for example, or in which these or other (optional) phases of operation 270 are performed by geographically distributed structures as described herein.

Any of such implementations may (optionally) likewise include one or more processor 731, 732 or other circuitry configured for accepting the text-containing content after one or more remote entities accept the delivery evaluation of the text-containing content in some circumstances, as exemplified above. This can occur in embodiments in which such instances become receptive to text-containing content only after an acceptance indication from such a remote entity, or otherwise in which a remote evaluation acceptance does not prevent such content acceptance.

Referring again to FIG. 8, any of the implementations described above with reference to FIGS. 1-11 may likewise include one or more instances of sensors 883, 884 or other circuitry for obtaining at least a partial content acceptance as the indication of the one or more message filtering rules as exemplified above. This can occur in embodiments in which such instances can respond to receivers, input devices, filters, search logic, or other condition detection devices as described herein, for example, with reference to device configuration or other phases of operation 250.

Referring again to FIG. 10, any of the implementations described above with reference to FIGS. 1-11 may likewise include one or more instances of content manager 1060 or other circuitry for signaling an acceptance of the text-containing content before receiving a last portion of the text-containing content as exemplified above. This can occur in embodiments in which such instances are operable to accept content in response to one or more versions 451, 580; one or more attributes 454, 574; one or more valuations 579, 918 or other values 746, 856; or other attributes of content 310, 450, 503, 1068 described herein with reference to or other applicability to operation 270.

Any of such implementations may likewise include one or more instances of content analyzer 1070 or other circuitry for signaling an acceptance of the text-containing content before receiving a last portion of the text-containing content as exemplified above. This can occur in embodiments in which such instances are implemented within content manager 1060 or other subsystem described herein with reference to various components of operation 270, in which such subsystems are omitted, and/or in which such instances are enabled by receiving an end-of-file marker or other indication of completeness.

Alternatively or additionally, any of the implementations described above with reference to FIGS. 1-11 may likewise include one or more instances of inventory manager 1082 or other circuitry for enabling, authorizing, triggering, validating, facilitating, or otherwise causing a resource transfer at least partly based on the delivery evaluation of the text-containing content as exemplified above. This can occur in embodiments in which such instances are implemented in completion actions or the like responsive to, overlapping, or otherwise relating to flow 200.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc), or (g) a wired/wireless services entity such as Sprint, Cingular, Nextel, etc.), etc.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

Although recipients or other users are described herein in some singular terms, those skilled in the art will appreciate that such users may be representative of a human user, a robotic user (e.g., computational entity), and/or substantially any combination thereof (e.g., a user may be assisted by one or more robotic agents). In addition, each such user, as set forth herein, although shown as a single entity may in fact be composed of two or more entities. Those skilled in the art will appreciate that, in general, the same may be said of "sender" and/or other entity-oriented terms as such terms are used herein.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    determining one or more message filtering rules at one or more intermediary systems based upon at least a partial rejection of one or more messages; and
    transmitting content to one or more target systems by at least one of the one or more intermediary systems after determining at least one of the one or more message filtering rules and after determining acceptability of the content based upon application of at least one of the one or more message filtering rules.

2. The method of claim 1, wherein the transmitting content to one or more target systems by at least one of the one or more intermediary systems after determining at least one of the one or more message filtering rules and after determining acceptability of the content based upon application of at least one of the one or more message filtering rules comprises:
    transmitting content to one or more target systems by at least one of the one or more intermediary systems after determining at least one of the one or more message filtering rules and after determining, before review of a last portion of the content, acceptability of the content based upon application of at least one of the one or more message filtering rules.

3. The method of claim 1, wherein the transmitting content to one or more target systems by at least one of the one or more intermediary systems after determining at least one of the one or more message filtering rules and after determining acceptability of the content based upon application of at least one of the one or more message filtering rules comprises:
    transmitting content to one or more target systems by at least one of the one or more intermediary systems after determining at least one of the one or more message filtering rules and after determining acceptability of the content based upon application of at least one of the one or more message filtering rules selected at least partly in response to one or more target identifiers of the content.

4. The method of claim 1, wherein the transmitting content to one or more target systems by at least one of the one or more intermediary systems after determining at least one of the one or more message filtering rules and after determining acceptability of the content based upon application of at least one of the one or more message filtering rules comprises:
    transmitting content to one or more target systems by at least one of the one or more intermediary systems after determining at least one of the one or more message filtering rules and after determining acceptability of the content based upon application of at least one of the one or more message filtering rules selected at least partly in response to one or more potential recipients.

5. The method of claim 1, wherein the transmitting content to one or more target systems by at least one of the one or more intermediary systems after determining at least one of the one or more message filtering rules and after determining acceptability of the content based upon application of at least one of the one or more message filtering rules comprises:
   accepting content for transmission to one or more target systems by at least one of the one or more intermediary systems after determining at least one of the one or more message filtering rules and after determining acceptability of the content based upon application of at least one of the one or more message filtering rules.

6. The method of claim 1, wherein the transmitting content to one or more target systems by at least one of the one or more intermediary systems after determining at least one of the one or more message filtering rules and after determining acceptability of the content based upon application of at least one of the one or more message filtering rules comprises:
   transmitting content to one or more target systems by at least one of the one or more intermediary systems after determining at least one of the one or more message filtering rules and after determining by one or more remote sources acceptability of the content based upon application of at least one of the one or more message filtering rules.

7. The method of claim 1, wherein the transmitting content to one or more target systems by at least one of the one or more intermediary systems after determining at least one of the one or more message filtering rules and after determining acceptability of the content based upon application of at least one of the one or more message filtering rules comprises:
   transmitting content to one or more target systems by at least one of the one or more intermediary systems after determining at least one of the one or more message filtering rules and after acceptance by one or more remote entities of one or more evaluations of the content based upon application of at least one of the one or more message filtering rules.

8. The method of claim 1, wherein the transmitting content to one or more target systems by at least one of the one or more intermediary systems after determining at least one of the one or more message filtering rules and after determining acceptability of the content based upon application of at least one of the one or more message filtering rules comprises:
   transmitting content to one or more target systems by at least one of the one or more intermediary systems after receiving at least a first portion of the content;
   determining one or more target identifiers of the content;
   determining one or more evaluations of the at least a first portion of the content based upon at least one of the one or more message filtering rules selected in response to at least one of the one or more target identifiers;
   determining that at least one of the one or more evaluations passes one or more quantitative criteria; and
   receiving acceptance of at least one of the one or more evaluations by one or more remote entities.

9. The method of claim 1, wherein determining one or more message filtering rules at one or more intermediary systems based upon at least a partial rejection of one or more messages comprises:
   initially determining one or more message filtering rules along one or more signal paths between one or more message sources and one or more message targets.

10. The method of claim 1, wherein determining one or more message filtering rules at one or more intermediary systems based upon at least a partial rejection of one or more messages comprises:
   determining one or more message filtering rules including at least one gradational threshold.

11. The method of claim 1, wherein determining one or more message filtering rules at one or more intermediary systems based upon at least a partial rejection of one or more messages comprises:
   determining one or more message filtering rules including at least one filtering indication.

12. The method of claim 1, wherein determining one or more message filtering rules at one or more intermediary systems based upon at least a partial rejection of one or more messages comprises:
   determining one or more message filtering rules at one or more intermediary systems based upon at least a partial rejection and a partial acceptance of one or more messages.

13. The method of claim 1, wherein determining one or more message filtering rules at one or more intermediary systems based upon at least a partial rejection of one or more messages comprises:
   determining one or more message filtering rules associated with one or more text and/or data patterns at one or more intermediary systems based upon at least a partial rejection of one or more messages.

14. The method of claim 1, wherein determining one or more message filtering rules at one or more intermediary systems based upon at least a partial rejection of one or more messages comprises:
   determining one or more message filtering rules at one or more intermediary systems after receiving at least a portion of the content.

15. The method of claim 1, further comprising:
   updating at least one of the one or more message filtering rules.

16. The method of claim 1, further comprising:
   transferring one or more resources at least partly in response to acceptability of the content.

17. A system comprising:
   means for determining one or more message filtering rules at one or more intermediary systems based upon at least a partial rejection of one or more messages; and
   means for transmitting content to one or more target systems by at least one of the one or more intermediary systems after determining at least one of the one or more message filtering rules and after determining acceptability of the content based upon application of at least one of the one or more message filtering rules.

18. The system of claim 17, wherein the means for transmitting content to one or more target systems by at least one of the one or more intermediary systems after determining at least one of the one or more message filtering rules and after determining acceptability of the content based upon application of at least one of the one or more message filtering rules comprises:
   means for transmitting content to one or more target systems by at least one of the one or more intermediary systems after determining at least one of the one or more message filtering rules and after determining acceptability of the content based upon application of at least one of the one or more message filtering rules selected at least partly in response to one or more target identifiers of the content.

19. A system comprising:
  circuitry for determining one or more message filtering rules at one or more intermediary systems based upon at least a partial rejection of one or more messages; and
  circuitry for transmitting content to one or more target systems by at least one of the one or more intermediary systems after determining at least one of the one or more message filtering rules and after determining acceptability of the content based upon application of at least one of the one or more message filtering rules.

20. The system of claim 19, wherein the circuitry for determining one or more message filtering rules at one or more intermediary systems based upon at least a partial rejection of one or more messages comprises:
  circuitry for initially determining one or more message filtering rules along one or more signal paths between one or more message sources and one or more message targets.

21. The system of claim 19, wherein the circuitry for determining one or more message filtering rules at one or more intermediary systems based upon at least a partial rejection of one or more messages comprises:
  circuitry for determining one or more message filtering rules including at least one gradational threshold.

22. The system of claim 19, wherein the circuitry for determining one or more message filtering rules at one or more intermediary systems based upon at least a partial rejection of one or more messages comprises:
  circuitry for determining one or more message filtering rules including at least one filtering indication.

23. The system of claim 19, wherein the circuitry for determining one or more message filtering rules at one or more intermediary systems based upon at least a partial resection of one or more messages comprises:
  circuitry for determining one or more message filtering rules at one or more intermediary systems based upon at least a partial rejection and a partial acceptance of one or more messages.

24. The system of claim 19, wherein the circuitry for transmitting content to one or more target systems by at least one of the one or more intermediary systems after determining at least one of the one or more message filtering rules and after determining acceptability of the content based upon application of at least one of the one or more message filtering rules comprises:
  circuitry for transmitting content to one or more target systems by at least one of the one or more intermediary systems after determining at least one of the one or more message filtering rules and after determining acceptability of the content based upon application of at least one of the one or more message filtering rules selected at least partly in response to one or more potential recipients.

25. The system of claim 19, further comprising:
  circuitry for updating at least one of the one or more message filtering rules.

26. The system of claim 19, wherein the circuitry for determining one or more message filtering rules at one or more intermediary systems based upon at least a partial rejection of one or more messages comprises:
  circuitry for determining one or more message filtering rules associated with one or more text and/or data patterns at one or more intermediary systems based upon at least a partial rejection of one or more messages.

27. The system of claim 19, further comprising:
  circuitry for transferring one or more resources at least partly in response to acceptability of the content.

28. The system of claim 19, wherein the circuitry for determining one or more message filtering rules at one or more intermediary systems based upon at least a partial rejection of one or more messages comprises:
  circuitry for determining one or more message filtering rules at one or more intermediary systems after receiving at least a portion of the content.

29. The system of claim 19, wherein the circuitry for transmitting content to one or more target systems by at least one of the one or more intermediary systems after determining at least one of the one or more message filtering rules and after determining acceptability of the content based upon application of at least one of the one or more message filtering rules comprises:
  circuitry for accepting content for transmission to one or more target systems by at least one of the one or more intermediary systems after determining at least one of the one or more message filtering rules and after determining acceptability of the content based upon application of at least one of the one or more message filtering rules.

30. The system of claim 19, wherein the circuitry for transmitting content to one or more target systems by at least one of the one or more intermediary systems after determining at least one of the one or more message filtering rules and after determining acceptability of the content based upon application of at least one of the one or more message filtering rules comprises:
  circuitry for transmitting content to one or more target systems by at least one of the one or more intermediary systems after determining at least one of the one or more message filtering rules and after determining by one or more remote sources acceptability of the content based upon application of at least one of the one or more message filtering rules.

31. The system of claim 19, wherein the circuitry for transmitting content to one or more target systems by at least one of the one or more intermediary systems after determining at least one of the one or more message filtering rules and after determining acceptability of the content based upon application of at least one of the one or more message filtering rules comprises:
  circuitry for transmitting content to one or more target systems by at least one of the one or more intermediary systems after determining at least one of the one or more message filtering rules and after determining, before receiving a last portion of the content, acceptability of the content based upon application of at least one of the one or more message filtering rules.

32. The system of claim 19, wherein the circuitry for transmitting content to one or more target systems by at least one of the one or more intermediary systems after determining at least one of the one or more message filtering rules and after determining acceptability of the content based upon application of at least one of the one or more message filtering rules comprises:
  circuitry for transmitting content to one or more target systems by at least one of the one or more intermediary systems after determining at least one of the one or more message filtering rules and after determining acceptability of the content based upon application of at least one of the one or more message filtering rules selected at least partly in response to one or more target identifiers of the content.

33. The system of claim 19, wherein the circuitry for transmitting content to one or more target systems by at least one of the one or more intermediary systems after determining at least one of the one or more message filtering rules and after determining acceptability of the content based upon application of at least one of the one or more message filtering rules comprises:

circuitry for transmitting content to one or more target systems by at least one of the one or more intermediary systems after
        receiving at least a first portion of the content;
        determining one or more target identifiers of the content;
        determining one or more evaluations of the at least a first portion of the content based upon at least one of the one or more message filtering rules selected in response to at least one of the one or more target identifiers;
        determining that at least one of the one or more evaluations passes one or more quantitative criteria; and
        receiving acceptance of at least one of the one or more evaluations by one or more remote entities.

34. The system of claim 19, wherein the circuitry for transmitting content to one or more target systems by at least one of the one or more intermediary systems after determining at least one of the one or more message filtering rules and after determining acceptability of the content based upon application of at least one of the one or more message filtering rules comprises:

circuitry for transmitting content to one or more target systems by at least one of the one or more intermediary systems after determining at least one of the one or more message filtering rules and after acceptance by one or more remote entities of one or more evaluations the content based upon application of at least one of the one or more message filtering rules.

35. The system of claim 19, wherein the circuitry for transmitting content to one or more target systems by at least one of the one or more intermediary systems after determining at least one of the one or more message filtering rules and after determining acceptability of the content based upon application of at least one of the one or more message filtering rules comprises:

circuitry for transmitting content to one or more target systems by at least one of the one or more intermediary systems after determining at least one of the one or more message filtering rules and after determining, before review of a last portion of the content, acceptability of the content based upon application of at least one of the one or more message filtering rules.

36. One or more non-transitory computer readable storage media bearing computer executable instructions for performing operations comprising:

determining one or more message filtering rules at one or more intermediary systems based upon at least a partial resection of one or more messages; and
    transmitting content to one or more target systems by at least one of the one or more intermediary systems after determining at least one of the one or more message filtering rules and after determining acceptability of the content based upon application of at least one of the one or more message filtering rules.

37. The media of claim 36, further comprising:
accessing one or more remote servers running another implementation of the operations.

38. One or more non-transitory computer readable storage media bearing computer executable instructions for indicating an occurrence of operations comprising:

determining one or more message filtering rules at one or more intermediary systems based upon at least a partial rejection of one or more messages; and
    transmitting content to one or more target systems by at least one of the one or more intermediary systems after determining at least one of the one or more message filtering rules and after determining acceptability of the content based upon application of at least one of the one or more message filtering rules.

\* \* \* \* \*

UNITED STATES PATENT AND TRADEMARK OFFICE
CERTIFICATE OF CORRECTION

| | | |
|---|---|---|
| PATENT NO. | : 7,930,389 B2 | Page 1 of 1 |
| APPLICATION NO. | : 11/986559 | |
| DATED | : April 19, 2011 | |
| INVENTOR(S) | : Jung et al. | |

It is certified that error appears in the above-identified patent and that said Letters Patent is hereby corrected as shown below:

At Column 31, Line 33, Claim 23 please replace "...intermediary systems based upon at least a partial resection of..." with --...intermediary systems based upon at least a partial rejection of...--

At Column 34, Line 15, Claim 36 please replace "...resection of one or more messages; and..." with --...rejection of one or more messages; and...--

Signed and Sealed this
Twenty-fifth Day of December, 2012

David J. Kappos
*Director of the United States Patent and Trademark Office*